(12) United States Patent
Tocino Diaz et al.

(10) Patent No.: US 9,081,419 B2
(45) Date of Patent: Jul. 14, 2015

(54) NATURAL GESTURE BASED USER INTERFACE METHODS AND SYSTEMS

(71) Applicant: Softkinetic Software, Brussels (BE)

(72) Inventors: Juan Carlos Tocino Diaz, Brussels (BE); Kevin Simons, Brussels (BE); Gilles Pinault, Anderlecht (BE); Xavier Baele, Woluwe-Saint-Lambert (BE); Julien Thollot, Wezembeek-Oppem (BE); David Dal Zot, Orbais (BE)

(73) Assignee: Softkinetic Software, Brussels (BE)

( * ) Notice: Subject to any disclaimer, the term of this patent is extended or adjusted under 35 U.S.C. 154(b) by 57 days.

(21) Appl. No.: 13/931,332

(22) Filed: Jun. 28, 2013

(65) Prior Publication Data

US 2014/0007022 A1    Jan. 2, 2014

Related U.S. Application Data

(63) Continuation of application No. PCT/EP2012/050115, filed on Jan. 4, 2012.

(30) Foreign Application Priority Data

Jan. 5, 2011   (EP) .................................. 111502712

(51) Int. Cl.
*G06K 9/00*    (2006.01)
*G06F 3/01*    (2006.01)
*G06F 3/03*    (2006.01)
*A63F 13/20*   (2014.01)

(52) U.S. Cl.
CPC ............. *G06F 3/017* (2013.01); *A63F 13/06* (2013.01); *G06F 3/0304* (2013.01); *G06K 9/00355* (2013.01); *A63F 2300/1087* (2013.01); *A63F 2300/6045* (2013.01)

(58) Field of Classification Search
None
See application file for complete search history.

(56) References Cited

U.S. PATENT DOCUMENTS

| 2004/0071317 | A1* | 4/2004 | Pavlovie et al. ............... 382/103 |
| 2008/0120113 | A1* | 5/2008 | Loyall et al. .................. 704/270 |
| 2009/0079813 | A1  | 3/2009 | Hildreth |
| 2011/0151974 | A1* | 6/2011 | Deaguero ....................... 463/37 |

(Continued)

FOREIGN PATENT DOCUMENTS

| JP | 2010525432 | 7/2010 |
| JP | 2010262400 | 11/2010 |

(Continued)

OTHER PUBLICATIONS

European Patent Office International Search Report and Written Opinion dated Feb. 24, 2012, for International Application PCT/EP20128050115 (2 pages).

(Continued)

*Primary Examiner* — Randolph I Chu
(74) *Attorney, Agent, or Firm* — Koppel, Patrick, Heybl & Philpott

(57) ABSTRACT

Described herein is a user interface that provides contextual feedback, controls and interface elements on a display screen of an interactive three-dimensional imaging system. A user interacts with the interface to provide control signals in accordance with those recognized by the system to a makes use of at least one POI in a three-dimensional scene that is imaged by the imaging system to provide control signals for the user interface. Control signals are provided by means of gestures which are analyzed in real-time by gesture recognition processes that analyze statistical and geometrical properties of POI motion and trajectories.

20 Claims, 27 Drawing Sheets

(56) References Cited

U.S. PATENT DOCUMENTS

| | | | |
|---|---|---|---|
| 2011/0310226 A1* | 12/2011 | McEldowney | 348/46 |
| 2012/0089949 A1* | 4/2012 | Chen et al. | 715/848 |
| 2012/0194561 A1* | 8/2012 | Grossinger et al. | 345/661 |
| 2013/0027293 A1* | 1/2013 | Baele et al. | 345/156 |
| 2014/0218493 A1* | 8/2014 | Dialameh et al. | 348/62 |

FOREIGN PATENT DOCUMENTS

| | | |
|---|---|---|
| JP | 2010541398 | 12/2010 |
| WO | WO03/071410 | 8/2003 |
| WO | WO2006/078996 | 7/2006 |
| WO | WO 2008/0128568 | 10/2008 |
| WO | WO 2010/0011923 | 1/2010 |
| WO | WO 2010/0138952 | 12/2010 |

OTHER PUBLICATIONS

European Patent Office International Preliminary Report on Patentability dated Jan. 15, 2013, for International Application PCT/EP20128050115 (17 pages).

European Patent Office Communication Pursuant to Article 94(3) EPC, dated Oct. 26, 2012, issued on the corresponding European application No. 11150271.2 (6 pages).

Applicants' response to Communication Pursuant to Article 94(3) EPC, dated Feb. 27, 2013, issued on the corresponding European application No. 11150271.2 (4 pages).

European Patent Office Communication (under Rule 71(3) EPC), dated May 8, 2013, issued on the corresponding European application No. 11150271.2, (84 pages).

Office action with English translation, dated Nov. 22, 2013, from the Japanese Patent Office for corresponding Japanese Patent Application No. 2013-546740 (7 pages).

Excerpt of Reference 6 to Japanese Office Action dated Nov. 22, 2013, with English translation, for corresponding Japanese Patent Application No. 2013-546740 (8 pages).

Excerpt of Reference 7 to Japanese Office Action dated Nov. 22, 2013, with English translation, for corresponding Japanese Patent Application No. 2013-546740 (13 pages).

* cited by examiner

```
1 1 2 3 3 2 3 3 3 4 3
4 5 2 3 3 3 3 3 3 3 3
4 5 2 2 4 4 4 4 4 1 1
4 4 2 2 4 4 3 4 4 1 1
4 4 3 3 3 3 4 4 3 1 1
4 4 3 3 3 5 5 5 5 5
5 5 3 3 1 1 5 5 5 5 5
5 5 3 3 1 1 5 5 5 5 5
5 5 5 1 1 1 5 5 5 5 5
5 5 5 2 1 1 5 5 5 5 5
5 5 5 1 1 1 5 5 5 5 5
```
Fig. 7A
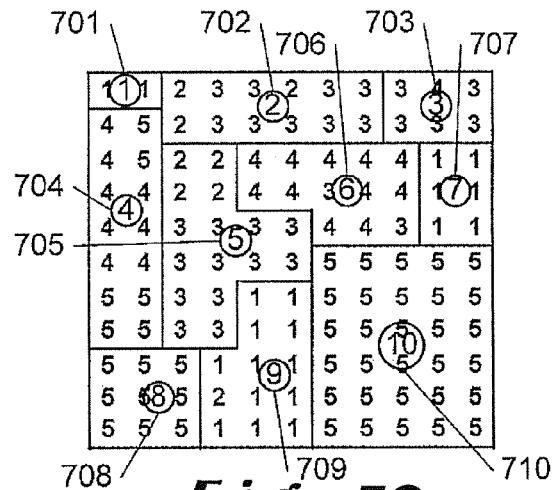
Fig. 7C
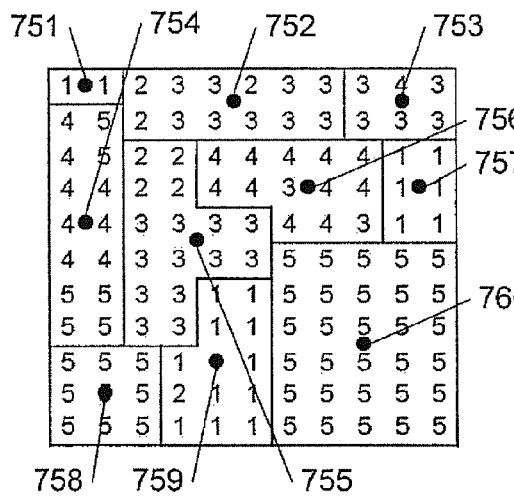
Fig. 7B
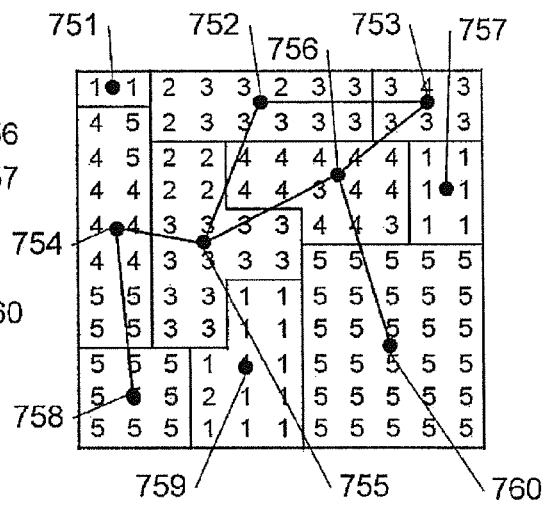
Fig. 7D

NATURAL GESTURE BASED USER INTERFACE METHODS AND SYSTEMS

CROSS REFERENCE TO RELATED APPLICATIONS

The present application is a continuation of International Application No. PCT/EP2012/050115, with an international filing date of Jan. 4, 2012, which in turn claims benefit of European Patent Application No. EP111502712, filed on Jan. 5, 2011. The entire contents of both of these applications are incorporated herein by reference.

BACKGROUND

The present invention relates to natural gesture based user interface methods and systems and is more particularly concerned with natural gesture recognition based user interfaces for navigation and control for computerised systems.

Computer vision technology has evolved to the state where real time accurate three-dimensional scene measurements can be obtained. These scene measurements allow image processing systems to compute and provide new kinds of inputs such as potentially object/user to system interaction where the input interaction relates to movements and/or gestures of the object/user within a field of view within a viewed scene.

Several kinds of user interface devices and methods are currently available. Apart from interfaces devices, such as, mouse, joystick, computer keyboard, touch-screen or infrared remote control technologies, the most recent technology is based on three-dimensional imaging or sensing systems that detect and make it possible to model and simulate a human body in a scene. Body parts can be extracted from the simulation, for example, the hands, and can typically be monitored with respect to their position over time. The hands may thus be used to execute gestures which can then be recognised by the imaging or sensing system. These gestures aim to initiate trigger events and/or provide continuous input data to a computer interface that interacts according to the received input.

DESCRIPTION OF THE PRIOR ART

A gesture-based navigation system is described in WO-A-2009/042579 that is used to control communications sessions with customised icons surrounding a representation of a recognised user. An enhanced interface for voice and video communications is provided in which a gesture of a user is recognised from a sequence of camera images. A user interface is also provided that includes a control and a representation of the user. The method is directed to a navigation interface and system that uses image processing to perform the gesture recognition to trigger control inputs. For example, a telecommunication session state can be changed from a standby state to a call or menu state by the recognition of an engagement gesture made by the representation of the user.

Other gesture-based navigation systems are described in WO-A-2009/035705, WO-A-2009/108894 and WO-A-2004/070595. In WO-A-2009/035705, a simple system and a method for processing gesture-based user interactions with an interactive display in a three-dimensional environment are disclosed. The display represents the hand of a user with an icon that can interact with the system.

In WO-A-2009/108894, an enhanced input using recognised gestures of a user is described. A representation of the user is displayed in a central region of a control that further includes interaction elements disposed radially in relation to the central region. The enhanced input also includes interacting with the control based on the recognised gestures of the user, and controlling an application based on interacting with the control. The interaction elements may take the form of a series of icons which are selected using a broad scope of gestures of the representation of the user, for example, gestures from the finger to the facial expression, through hands, eye or body movements.

In WO-A-2004/070595, a device and a method for interactively controlling, using gestures, a mouse pointer in an image of a graphic user interface of an image-representing apparatus is disclosed. The device comprises a video camera for generating an auxiliary image, an image-processing device which processes image data of the auxiliary image, and a mirror unit for mirroring the auxiliary image. An analysis unit is also provided for detecting an object captured by the video camera and determining a momentary position of the detected object in the auxiliary image. A mouse control mechanism is connected to the analysis unit and represents and moves the mouse pointer within the image of the image-representing apparatus according to the respective determined momentary position, and a mixing and/or cross-fading device which is connected to the mirror unit that is configured to superimpose the main image and the mirrored auxiliary image obtained by the mirror unit in a partially transparent manner in the image of the image-representing apparatus.

User feedback from a user interface is described in WO-A-2010/126714. Here, a capture device is used to capture the motion of a user and a device is provided to display a model that maps to the motion of a user. Gestures are used for control of the user interface. However, a user may be unfamiliar with a system that maps his motion or may not know what gestures are applicable for an executing a particular application, and is therefore unaware of how to perform gestures that are applicable for the executing application. Providing visual feedback representing instructional gesture data to the user can teach the user how to properly gesture. The visual feedback may be provided in any number of suitable ways. For example, visual feedback may be provided using ghosted images, player avatars, or skeletal representations. The system can also process pre-recorded or live content for displaying visual feedback representing instructional gesture data. The visual feedback can portray the differences between the actual position of the user and the ideal gesture position.

In WO-A-2010/103482 a method for operating a computerised system, typically a virtual keyboard, is described in which user interface elements are presented on a display screen. A first gesture made in a three-dimensional space by a body part of a user is detected, and in response to the first gesture, an area of the display screen pre-selected by the user, by pointing, is identified. A magnification level of one or more of the user elements appearing in the selected area on the display screen is then increased. After increasing the magnification level, a second gesture made by the part of the body of the user is detected so as to select the pre-selected element from among those appearing on the user interface. A third gesture decreases the magnification level of the user interface elements.

WO-A-2003/071410 describes a generic gesture recognition system and method which is related to body gestures, and especially related to the hand gestures, and that uses depth-perceptive sensors. A three-dimensional sensor provides three-dimensional position information for a plurality of discrete regions of body parts of a user. Gestures are recognised from the shapes of the body parts (i.e. the hands) and their position and orientation over an interval. The gesture is classified for determining an input into a related electronic device. An undefined segmentation module uses depth information to separate body parts of the user from the background. Pixel groups that interact with the system are supposed to be a portion of the hand that are identified has being the closest object from the camera, or they are identified has belonging to the user as they are demonstrating same light reflectance properties as human skin. Gesture recognition is determined from the pose and the posture of the pixel group which is supposed to represent the hand, the pose being related to the position and orientation of the hand shape and the posture being related to the combination of the shape and the pose. Dynamic gesture recognition can be performed automatically based on undefined classification based algorithms, on definition of delimiter functions to trigger beginning or end of dynamic gestures such as a specific hand gesture, a specific motion, a specific sound, or a key input. A confirmation function is required in which the user has to validate the gesture for verification. This is done by the use of another gesture, a sound, or a text input on a hardware keyboard.

More specific gesture recognition is described in WO-A-2010/011923 and WO-A-2010/011929. In these documents, techniques for wave and circular gestures recognition are described within a particular signal processing embodiment.

In WO-A-2010/011923, an enhanced detection of a circular engagement gesture is described, in which a shape is defined within motion data, and the motion data is sampled at points that are aligned with the defined shape. Here, the determination is whether a moving object is performing a gesture correlating to the defined shape based on a pattern exhibited by the sampled motion data. An application is controlled if it is determined that the moving object is performing the required gesture.

WO-A-2010/011929 discloses an enhanced detection of a waving engagement gesture in which a shape is defined within motion data, the motion data being sampled at points that are aligned with the defined shape, and, based on the sampled motion data, positions of a moving object along the defined shape are determined over time. Determination of whether the moving object is performing a gesture based on a pattern exhibited by the determined positions is used to control an application if the moving object is performing the required gesture.

However, many of the systems described above require the user to be prior detected and located into the scene, require at least the hand body part to be located into the scene, and/or require the modelling of a representation of a user from which it is easier to extract a position of a body part, for example a hand, since hands are the main body parts used for interaction with system interfaces.

It is therefore an object of the present invention to provide a user interface that can easily be integrated with a three-dimensional imaging system so that gestures made by a user or an object can be used to control the operation of the imaging system without having to model a representation of the user or of the object. In addition, there is no requirement for prior detection or tracking of the position of the user or object within the scene.

SUMMARY OF THE INVENTION

In accordance with the present invention, there is provided a method for interacting with a user interface system using gesture recognition, the method comprising the steps of: a) forming at least one multi-dimensional representation of a scene within a field of view of at least one multi-dimensional imaging system; b) performing a multi-dimensional constrained clustering operation on said multi-dimensional representation to provide a clustered representation of said scene; and c) identifying point of interest candidates from said clustered representation which can be used for gesture recognition; and d) controlling said user interface system in accordance with recognised gestures; characterised in that step c) comprises identifying at least one cluster that is connected to only one other cluster and which exhibits coherent motion as a point of interest candidate.

The method further comprises using at least continuous trajectory analysis including the steps of: identifying trajectory points along a trajectory of a point of interest candidate; identifying at least one multi-dimensional change in trajectory direction of a point of interest candidate, said at least one multi-dimensional change forming a reference seed point having a reference seed identification order; identifying successive changes in trajectory direction, each of said successive changes forming successive reference seed points; and using said reference seed points and said trajectory points to recognise a gesture.

As part of gesture recognition, said reference seed identification order may be used.

Advantageously, said trajectory analysis further comprises the step of: determining, for each point, at least one of distance, velocity vector or acceleration vector in relation to previous points. A further step of using geometric and statistical computation for each point to recognise the gesture may be implemented.

In accordance with one embodiment, a point of interest candidate may be activated as an activated point of interest if it has first performed a predetermined gesture, said activated point of interest still having point of interest candidate status. In this case, a region of interest may be associated with said activated point of interest. Further point of interest candidates may also be activated as at least one further activated point of interest when each point of interest candidate has performed a predetermined gesture, said at least one further activated point of interest still having point of interest candidate status.

Moreover, at least one further region of interest may be determined that can be associated to said at least one further activated point of interest. Each region of interest may have its position and dimensions set relative to a position of a point of interest candidate.

Additionally, the method comprises the step of recognising a predetermined gesture performed by at least one predetermined point of interest candidate within said at least one determined region of interest.

Advantageously, said user interface system includes a gesture based virtual keyboard having a graphical user interface, said graphical user interface having a predetermined arrangement of elements for selection using only minimal natural gestures.

In one embodiment, the method further comprises the step of e) controlling said user interface system in accordance with coherent motion of at least one point of interest candidate.

Contextual feedback information in accordance with current status of said user interface system may be provided.

Step b) may comprise using multi-resolution image processing.

In a preferred embodiment, each multi-dimensional representation may comprise a three-dimensional representation.

BRIEF DESCRIPTION OF THE DRAWINGS

For a better understanding of the present invention, reference will now be made, by way of example only, to the accompanying drawings in which:

FIGS. 7A, 7B, 7C, and 7D illustrate the use of a constrained K means leader-follower algorithm to determine a link graph for centroids and extremities;

BRIEF DESCRIPTION OF THE INVENTION

Figure 1:
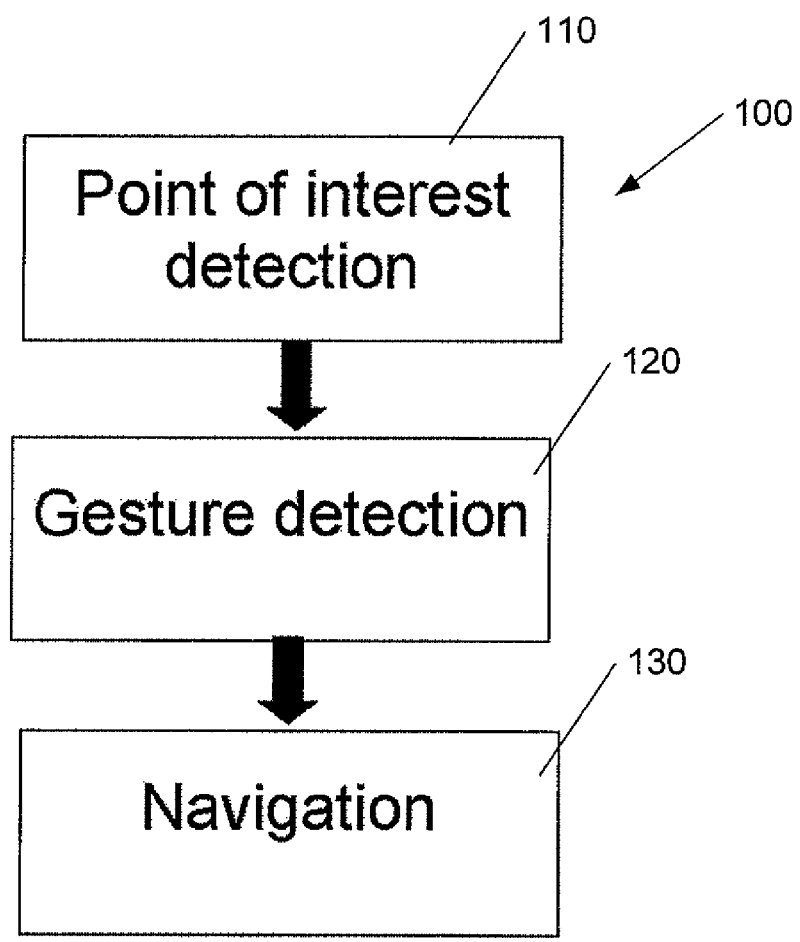
FIG. 1 illustrates a flow diagram of the major elements of the present invention.

The present invention discloses a natural gesture remote control navigation system and its associated methods that provide contextual controls and contextual interface elements, as well as providing contextual user feedbacks. Innovative image processing techniques are used to process outputs from a three-dimensional imaging device. At least one POI is identified in the three-dimensional scene, the POI interacting within at least one delimited ROI so that real time natural gesture recognition analysis can be performed on each identified POI using an innovative and efficient trajectory and/or motion analysis. Output data of gesture recognition analysis may then be used as a continuous pointing signal and for triggering events within the system, for example, selection and activation of elements within the system. The system utilises a natural gesture driven user interface that is compliant with intuitive, natural and pain-less controls.

More precisely, the present invention provides a novel and efficient method and system that make it possible to extract, from a semantic-less multi-dimensional point cloud or from pixels of a captured depth map image or series of captured depth map images, some data defining the interaction between a user and a machine or system. In that sense, the data is split into two classes: the first one being the input data which allows the user to control and deliver information to the interface; and the second one being the contextual data output by the machine or system and a related application. In accordance with the present invention, the user interface system includes feedback/information to the user, for both of the two sets of data. Even more precisely, it also provides a method of how to identify at least one POI relating to a body or to an object that is used to interact with the system/machine/user interface.

Furthermore, the method and system of the present invention may also define a contextual interface system which, in combination with natural gesture controls, requires the user to interact in a most intuitive and efficient way whilst providing feedback information relating to the expected gestures and those performed. All of the above overcomes the constraints of real-time cross-platform processing compatibility.

More precisely, the present invention provides a navigation method and system that present at least contextual feedbacks, controls and interface elements, for example, on a display screen. The feedback may be extended to any other device able to provide any sense-related signals. Here, the method and system make use of three-dimensional imaging device to detect at least one POI in a three-dimensional scene. In addition, the navigation method and system also includes an embedded real-time natural gesture recognition analysis system that is performed on the detected POI and more precisely onto the discrete readings of their trajectory. Output data from the natural gesture recognition analysis system is used as a controller for the user interface.

This disclosure also relates to user interfaces and contactless remote control systems based on multi-dimensional, and in particular, based on three-dimensional image processing, that includes POI detection and natural gesture recognition. In this respect, the present invention utilises an imaged scene that can be segmented in an intelligent way using a clustering algorithm that generates clusters demonstrating spatio-temporal coherency over time. The user interface of the present invention may use, as an input, depth maps representing a three-dimensional scene where each pixel in the scene has x- and y-coordinates as well as a z-coordinate; known as the depth value. Outputs from the user interface include both continuous and sporadic events produced by gestures of a user. Contextual user interface feedbacks may also be used.

More precisely, pixels in the scene may be grouped into clusters with some spatial constraints using typically a mix of K-means and leader-follower segmentation algorithms. Clusters may be produced and destroyed at least in accordance with the leader-follower segmentation algorithm and some predefined parameters. One such parameter may be the minimum number of pixels that need to be present in each cluster. Alternatively, a maximum radius of the cluster may be used as a parameter. In addition, an identification code may be allocated to each cluster and clusters from a previous frame and used as seeds for the current frame.

In addition, intentional movement of a user within the scene has the effect of making clusters move with a particular behaviour that can be distinguished from noise or unintentional movements in the scene and therefore allows clusters to be identified as being a POI candidate that needs to be analysed. Once, at least a first cluster has performed an activation gesture, that cluster may be identified as a POI. Scene analysis can then be potentially reduced to a ROI that surrounds the location of that POI.

Using the above, the present invention provides a robust and efficient method that can be used to provide control for a user interface. Ideally, there is no need for (i) background removal from the scene as the entire scene is clustered and analysis of the motion of each cluster is performed over time; (ii) scene calibration as a three-dimensional camera used with the imaging system provides reliable measurements in a reliable coordinate system; (iii) identification of the user or object in the image as the moving POI having spatio-temporal coherency properties and also being at least an extremity in a preferred embodiment, the POI exhibiting coherent movement in an even more preferred embodiment; (iv) identification of the hands or any other parts of limbs of a human being user as the coherent moving POI will be the one that supports the control; and (v) a motion estimation or a tracking algorithm as the temporal coherency of the obtained POI is significant and reliable enough.

Additionally, the method of the present invention allows control to be provided using other parts of the user, for example, the feet, the hands and objects held in the hands. Control may also be provided by objects that are able to perform the specific movements related to the expected gestures.

DESCRIPTION OF THE SPECIFIC EMBODIMENTS OF THE INVENTION

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

According to one general implementation, a user may interact with a computerised system, such as a home "domotic" controller or a multimedia navigation system connected to at least one device in order to provide contextually some feedback information, and also to capture three-dimensional scene information. A rendering device, such as for example a device display, may be used to provide some visual feedback information such as a change of the representation of at least one element in the visualisation of a graphical user interface (GUI). In another example, a capturing device may be a three-dimensional camera which provides three-dimensional images of the scene with which a user is to interact. The method and system may also in another complementary implementation embed loudspeakers, for example, in order to provide additional audio feedback information to the user. Naturally other devices may be used to provide sensory feedback of other types.

Interaction from the user to the system may comprise straightforward, intuitive (that is, with a very short learning curve) and painless natural gestures while interaction from the system to the user may comprise sensory signals such as visual and/or audio contextual information in response to the user's actions. Interaction from the system to the user may also provide representations of the interactions the user is expected to perform.

The system and method may include, in a first step, providing an animated on a display screen, forming part of a graphical interface representing, a gesture expected to be performed by a human being with whom human-machine interactions will be exchanged. This step aims to start and initialise the interaction session. For example, the gesture expected may be a "hand waving" which can be represented by a text, an animated drawing or a video. The user may intuitively understand the visual signal and then may perform a waving gesture with at least one body part or with at least an object linked to one of his body parts. Typically, such a body part comprises a hand of a human user but it will be appreciated that the present invention is not limited to such a body part. Therefore, the system captures three-dimensional images of the scene using a camera device, performs some signal processing to localise and recognise the expected gesture, and then may localise and define a preferred region of interest (ROI) into which further interactions will preferably be looked for in the future. At the same time, the system may also identify a preferred POI (POI) which may be a group of pixels representing the body part which as performed the expected gesture. In this case, the POI is a partial representation of the user through which the next interaction will be provided. Thus, by performing the expected gesture, the user will activate himself as a system controller since he/she has given a feedback answer in the form the system was expecting. More precisely, the method and system will make the imaged point or the group of three-dimensional imaged points representing the hand that has performed the expected activation gesture, be the main POI the system is going to look at and analyse. This first step may be assimilated to an activation and identification phase. Therefore, this step is characterised in that no user needs to be detected before the detection of the preferred POI, and also that no body part or object identification has to be performed in advance.

In a second step, once, at least one ROI into which at least one POI is to interact exists, the system performs control gesture recognition on the identified first POI that is designated as the main POI in order to collect continuous pointing information or gesture event triggers. This second step may be considered as the main natural gesture based control of the interactive interface of the navigation system. For example, from the recognised gestures, the system dynamically and contextually makes the displayed GUI change. In one embodiment, this may also be done at activation gesture detection time. Typically but not exclusively, the system may display on screen a multimedia menu made of several elements, icons and/or representations that allow the user to start different kinds of sub menus or applications such as a WWW navigation, a map navigation, a music player, a video player, a TV channel explorer, a photo gallery player, games, a sound volume control, a voting application and so on. The layout of the interface, that is, each element, icon, and/or representation corresponding to at least a submenu or an application, may be organised in a way that makes the user perform the easiest and most natural gesture movements to select, preselect or activate any one of the elements, icons and/or representations. Selection can be made in several ways—for example, in its simplest form, selection can be achieved by pointing at the GUI element. Timer controls and other gestures can be used in combination with the simplest form.

Typically, selection, pre-selection or activation may be performed through natural gesture remote control, by moving a representation of the user, for example, a mouse pointer or an avatar, onto a desired GUI element, and then waiting for an associated timer period linked to that element ends, a representation of the time elapsed or the remaining time being displayed on the interface as the feedback information.

In another embodiment, selection, pre-selection or activation may also be performed within more than one step. Typically, but not exclusively, selection, pre-selection or activation may be performed in a two step process including a first step in which a desired element is selected using gesture based continuous pointing features of the method and system, and a second step based on another natural control gesture that may be culturally neutral and semantically relevant, such as, a click gesture or a push movement gesture, that will start the interaction attached or linked to the element or representation to which the POI points occurs, for example, to change the displayed interface menu, changing the interface layout, executing an application etc.

Both first step and second step of the method and system are compliant with multi-POI and multi-ROI to allow several users to interact with several parts within at least one computerised system at the same time, or to interact with several computerised systems linked together other on a network.

In another embodiment, human-to-machine and machine-to-human interaction processes are defined as intuitive and natural, such that naïve or experienced users do not need, at least partially, to get feedbacks about the gestures they are expected to perform to interact with the system. For example, a naïve user may intuitively perform a natural waving gesture in front of a natural gesture based system in order to initialise the interaction process in the same way he would engage communication with a distant human being. In another example, a human being user who has already experienced a natural gesture based interaction system would not require any displayed information on a screen to remind him or to teach him how to make a main menu or a sound control menu appear. An experienced user would know that, at any time, by performing a circle gesture, the main menu of the system would appear on screen, and that, once the interaction with gesture based interactive system has started by performing an activation gesture, such as a "waving gesture", as described above, performing a waving gesture again would make appear the sound control menu whatever is the application or the displayed interface on screen. Alternatively, a semantic gesture, such as using the hands to cover the ears of a user, could be used as a control gesture for muting sound in the system.

In another embodiment of the present invention, contextual interactions with natural gestures may be illustrated so that a natural gesture, such as the "waving gesture", may be used in different way at different time relative to the status of the system and its applications. In a more precise example, within the first step, the wave gesture may be used to initialise, start or activates the interaction between a user and a system which is providing an animated picture based information asking the user to perform the "wave gesture". Within a second step, once the user as activated the interactive system by performing the requested gesture, the "wave gesture" may make a sound control interface appear onto the display screen when it is performed whatever the status of the application or the GUI displayed. In a third step, if the sound control menu is displayed, performing the wave gesture again would make it disappear.

In a preferred embodiment, if a determined application has been launched, the control associated with a gesture may be dynamically loaded and unloaded, for example, the "wave gesture" may dynamically be associated to an interaction process such as erasing a character selection in a virtual keyboard application interface. The "wave gesture" may be automatically re-associated to the call of the sound menu bar when quitting the particular virtual keyboard application.

In a preferred embodiment of the system and method, image capturing device may make use of two-dimensional camera, stereoscopic camera, LIDAR, sonic-imagers, three-dimensional camera including the commonly known structured light three-dimensional camera and time-of-flight (TOF) cameras. In a more preferred embodiment, the system and method makes use of depth map or three-dimensional point cloud input data types.

In a preferred embodiment, depth map or multi-dimensional point clouds are grouped into spatio-temporally meaningful clusters, each cluster being represented by a centroid and having an identity which allows tracking of its individual movements with respect to time. In a more preferred embodiment, three-dimensional scene clustering may be, for example, a constrained K-means leader-follower clustering algorithm.

In another embodiment, POI and ROI detection, localisation and identification utilise signal processing algorithm performed on the input data, and more especially, by analysing clusters or centroid movements. In a preferred embodiment, at least a first POI is identified and attached to a centroid or a cluster if the centroid or cluster has performed the activation gesture as described above. In a more preferred embodiment, the centroid or related cluster that as performed the activation gesture has to be an extremity of a region adjacencies graph (RAG) of the clustered multi-dimensional scene point cloud. In an even more preferred embodiment, determining if coherent moving clusters or centroids are the best POI candidates, it is necessary to remove false positive and ambiguity among several candidates.

In another embodiment, if no centroid or cluster has already satisfied the activation gesture, the master POI will be the one that will perform the activation gesture first. Any other coherent moving extremity in an area around the main POI may be assimilated as a slave POI. Master and slave status of POI may be swapped according to some predefined rules. The area around the POI is the ROI, the position of which is centred on a spatial location relative to the position at which the activation gesture has been detected.

The ROI position can be either static or dynamic. This means that the position can change according to at least one POI position. Dimensions of a ROI can also be either static or dynamic. This means that dimensions can be modified if one static POI moves out of the initially defined ROI.

If after a certain duration, any of the POI in a determined ROI are not moving enough, or any of the identified POI have moved out of the ROI, the system may destroy the corresponding POI and ROI since they can no longer provide any interaction. At that time, the system will wait for a new POI and ROI to be identified using the same process performed in the first step of the method and system described above.

In another embodiment, a security timer may allow the recently disabled or de-activated POI to be enabled or re-activated when it starts interacting again if moving enough or if re-entering the ROI to which it is linked to. During this security timer, the corresponding POI and ROI are only disabled or de-activated instead of being destroyed.

In another preferred embodiment, natural gesture recognition is performed by analysis of the trajectory of the centroids or the clusters of the segmented input image regardless of the particular step in the method and system. This means that, for the first step in which activation gesture is searched, or for the second step in which control gesture is searched, gesture recognition relies on detecting natural gestures, such as, "wave", "push", "click", "pull", "still", "pointing" as well as basic geometric shape detection, such as, "circle", "square", "rectangle", "lines", "cross", "triangles" etc.

In a more preferred embodiment, gesture recognition is performed on master and/or slave POI trajectory in a corresponding ROI.

In an even more preferred embodiment, the gesture recognition is performed by analysis of the change of direction of the POI trajectory, time between consecutive POI change of direction within a determined duration, Euclidian distance between consecutive POI trajectory changes in direction, POI speed between consecutive POI trajectory changes of direction, and POI acceleration between consecutive POI trajectory changes of direction. POI trajectory change of direction means at least a change in X-, in Y- or in Z-direction of the POI from frame to frame of the consecutive captured images. These POI trajectory changes create reference seed points to which subsequent positions of a POI are compared. In addition, the trajectory analysis may preferably include analysis of ordering creation of the reference seed points in order to recognise the performed gesture.

In an even more preferred embodiment, the trajectory change in direction analysis method is used to determine coherent moving centroids or clusters among POI candidates if a computation of X, Y, Z changes of direction and a computation of cumulative distances between the trajectory changes in direction remain under at least a predetermined threshold.

In either activation gesture or control gesture of the first and second steps described above, gesture recognition is performed on POI with respect to time to extract gesture interaction triggers, such as, "click", "push", "wave" gesture events etc., and/or continuous data information, such as, a pointing position.

In a particular embodiment of the method and system, gesture recognition may be used to control a virtual keyboard application, the layout of the GUI of the virtual keyboard may be arranged in a way that allows the user to perform intuitively very simple movements with a limited number of gestures. In a preferred embodiment, the layout may require the user to perform only forward and backward gesture, for example, up and down or left to right etc., pointing movement with a POI representation to at least pre-select and then select a character without any other gesture. For example, the layout may be made of a pre-selection zone, a selection zone underneath the pre-selection zone, and a text box into which selected character can be displayed underneath the pre-selection zone. Additionally, a word pre-selection zone may also be provided below the text box. By moving up and down, the POI representation automatically selects elements of the corresponding zone to which it is currently pointing. In another embodiment, the user may be required to perform a determined gesture on each zone to validate the selected element.

In contrast to the disclosures of the prior art documents discussed above, the present invention provides a user interface method and system with a real-time interaction capability and is based on a novel multi-dimensional touch-less and marker-less gesture recognition technology. This allows predetermined interface elements to be displayed in relation to context/user/object interactions. The method and system are ergonomically optimised by making use of a gesture library restricted to the worldwide most common and known human gestures, for example, "continuous pointing", "wave", "push", "pull", "swipe left", "swipe right" and "circle" triggers, or all the most common geometrical shapes. In addition, the method and system are ergonomically optimised by minimising effort to improve the experience of the user in making both a single interaction and sequential interactions, for example, by making use of timers in combination with POI position, or by making use of simple control gestures to activate an interface feature or confirm a choice.

A menu in a navigation system may be provided that supports control elements, such as, icons, button, avatar etc. Alternatively or additionally, the control elements may define at least a multi-media menu and/or at least a virtual keyboard. Ideally, the arrangement of the supporting control element is organised so as to improve interaction efficiency and intuitiveness and thereby the experience of the user.

POI detection is based on multi-dimensional scene analysis. The scene comprises a three-dimensional clustered scene, the clusters of which demonstrate a spatio-temporal coherency. The scene analysis also supports a single and/or multiple points of interest as well as a single and/or multiple regions of interest.

The method and system of the present invention also supports the detection of activation gestures which defines both the ROI into which gesture-based interaction will be lead, and at least a main POI of scene that will generate those interaction gestures. Control gestures are used to trigger the interaction where the gesture recognition is performed by real-time POI trajectory analysis. In addition, a representation of the POI provides at least feedback about the movement of the POI and its position with respect to time.

The present invention will be described below with respect to: POI candidates detection, activation gesture recognition onto POI candidates; control gesture recognition from POI trajectory analysis; management of an identified POI with respect to time; management of an identified ROI with respect to time; interaction between POI and a user interface; optimisation of a contextual user interface navigation system; and optimisation of marker-less, gesture-based, virtual keyboard input user interface.

In FIG. 1, a flow diagram 100 illustrating the three main components for implementing the user interface of the present invention is shown. A POI within a scene is detected (step 110) using localisation and identification techniques in combination with an activation gesture recognition based on the trajectory analysis of candidate elements. Once at least a POI has been detected, gestures made by that POI are detected (step 120) based on the trajectory analysis thereof. Navigation using the user interface is then made using the detected gestures (step 130). These steps are described in more detail below.

Figure 2:
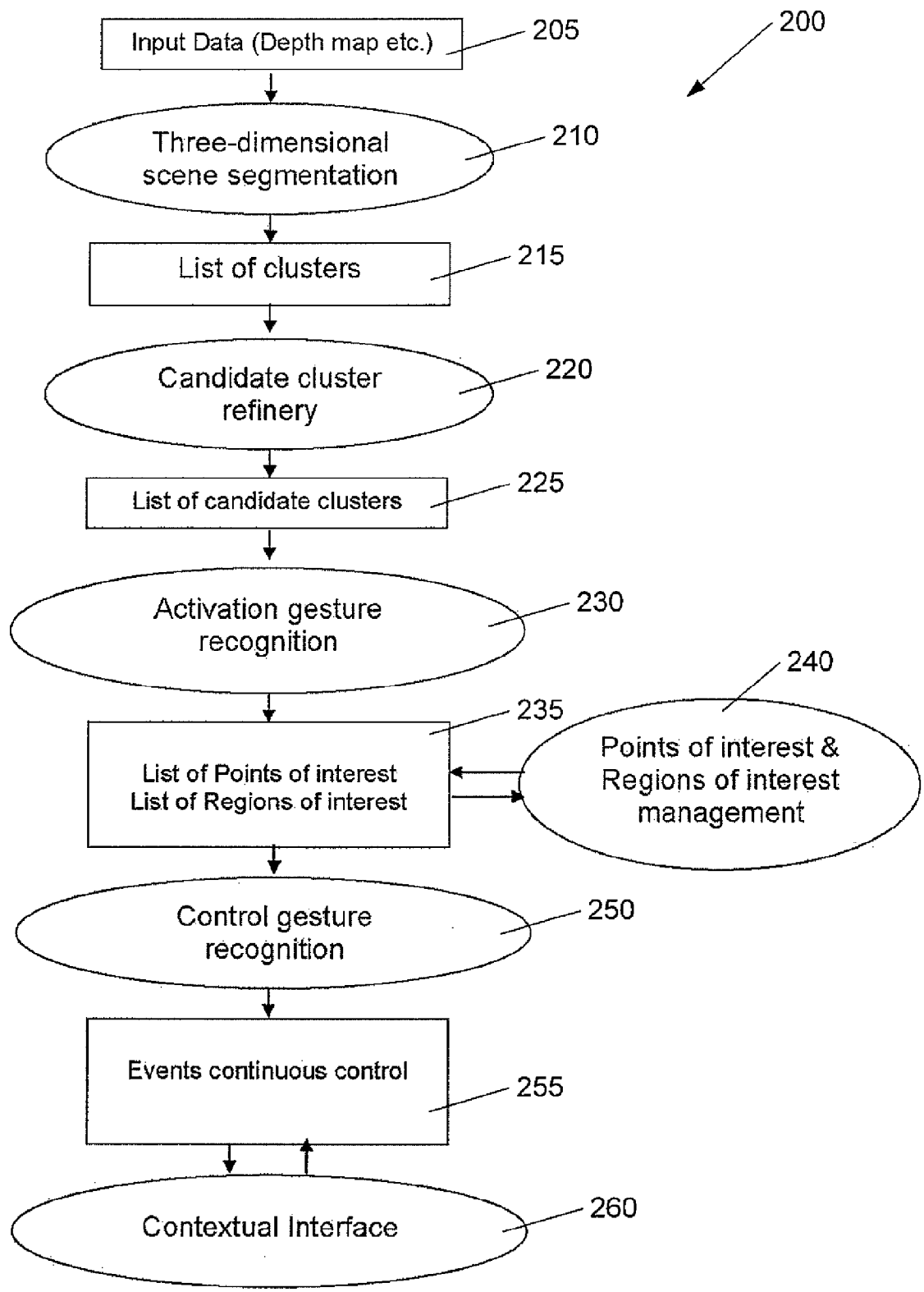
FIG. 2 illustrates a flow diagram of the operation of a user interface in accordance with the present invention.

FIG. 2 illustrates a flow diagram 200 showing the operation performed in a user interface according to the present invention. In step 205, input data is provided to the image processing system. This input data is in the form of a three-dimensional image of the scene including at least a depth map or a multi- or three-dimensional point cloud. The depth map corresponds to the distance of each point in the point cloud from a camera forming part of the imaging system of each pixel in the three-dimensional image. The three-dimensional image is then segmented (step 210) to create a plurality of clusters. In step 215, a list of clusters is provided as the output from step 210. The list of clusters is then used as the input for a candidate cluster refinery process, step 220, which provides a list of candidate clusters, step 225. Candidate cluster refinery aims to determine among all the scene clusters at least those demonstrating the property of being an extremity of the scene RAG, and also having coherent motion properties. These candidate clusters are used in the activation gesture recognition process in step 230, the aim of which is to determine which candidate cluster has first performed a predetermined activation gesture. As part of the gesture recognition, a list of points of interest and a list of regions of interest are generated, step 235. These lists are managed to remove useless POIs and ROIs, or to add new POI or ROI in the process, step 240, so as to form inputs for control gesture recognition, step 250. The control gesture recognition provides events triggers and continuous control, step 255, which are used for contextual interface control, step 260.

Figure 3:
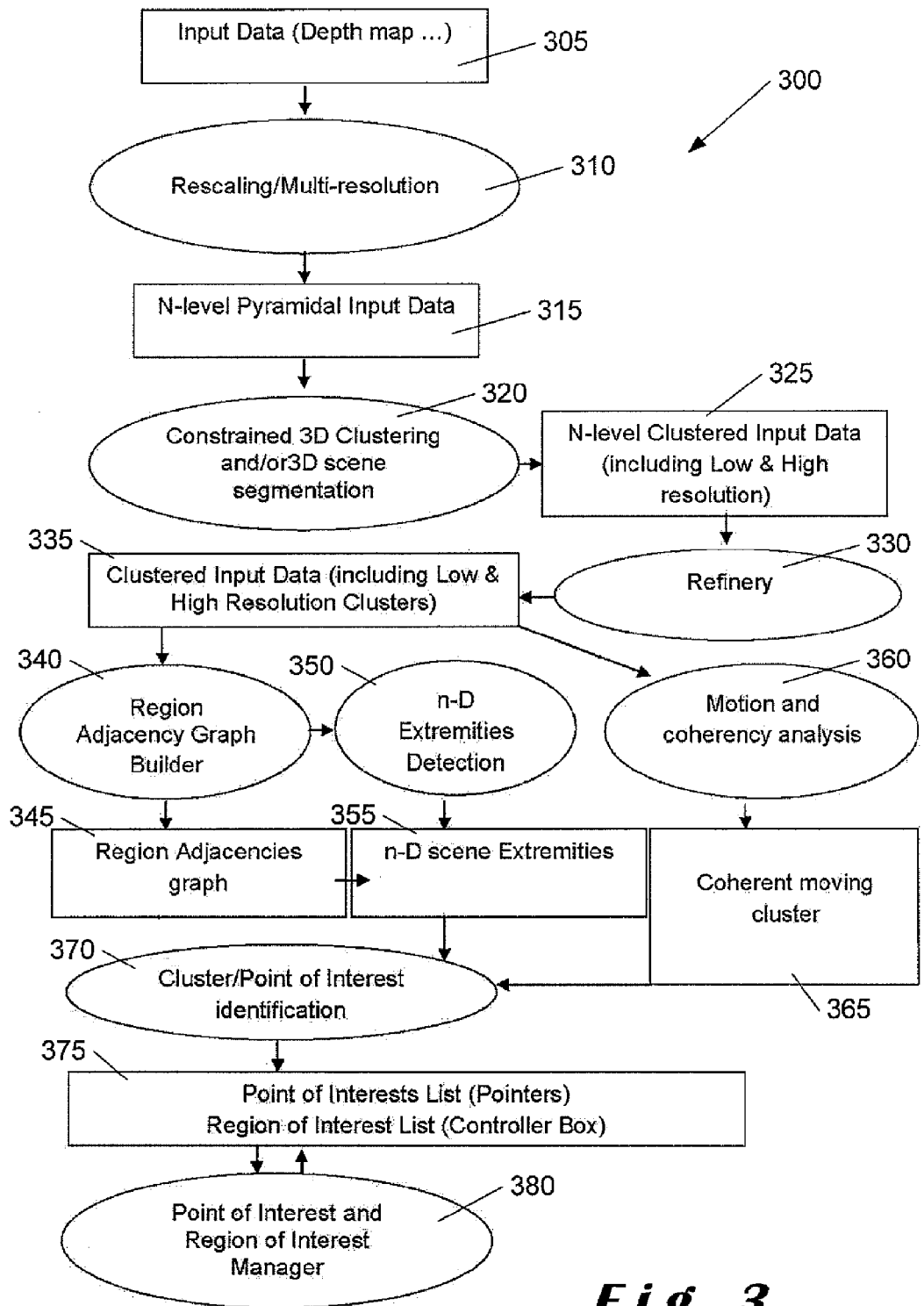
FIG. 3 illustrates a flow diagram of the operation of point of interest (POI) localisation and identification.

FIG. 3 illustrates a flow diagram 300 that shows a particular embodiment in which POIs are localised and identified. Input data may be in the form of a depth map. Depth map data is input in step 305 for a rescaling/multi-resolution process, step 310. The output from the rescaling/multi-resolution process comprises N-level pyramidal images input data, step 315. This data is then used in a constrained three-dimensional clustering and/or in a three-dimensional scene segmentation, step 320. The clustering and/or segmentation step provides N-level clustered input data that includes both low and high resolution data, step 325. The low resolution data is then refined in refinery step, step 330, which produces clustered input data that includes both low and high resolution clusters, step 335. The clustered input data is then used in a region adjacency graph (RAG) builder, step 340, in a n-dimension extremities detector, step 350, and in a motion and coherency analysis process, step 360. The adjacency graph builder produces a region adjacencies graph defining connections status in between clusters of the scene, step 345, the n-dimension extremities detector produces a list of scene clusters that comprise graph extremities, step 355, and the motion and coherency analysis determines a list of coherent moving clusters, step 365. Data relating to each of these three elements forms the input for a cluster and/or POI identification process, step 370, which determines at least a first POI as being a first coherent moving cluster, step 365, and as being a scene extremity, step 355, that demonstrates a specific motion which corresponds typically to an activation gesture. A list of POIs and a list of ROIs are produced, step 375. The lists of POIs and ROIs are input to the POI and ROI manager, step 380.

In steps 310 and 320 respectively, the order of the multi-resolution and three-dimensional scene segmentation is not important at this stage. It will be appreciated that multi-resolution is an optional process and the same results may be obtained using other processes.

Figure 4:
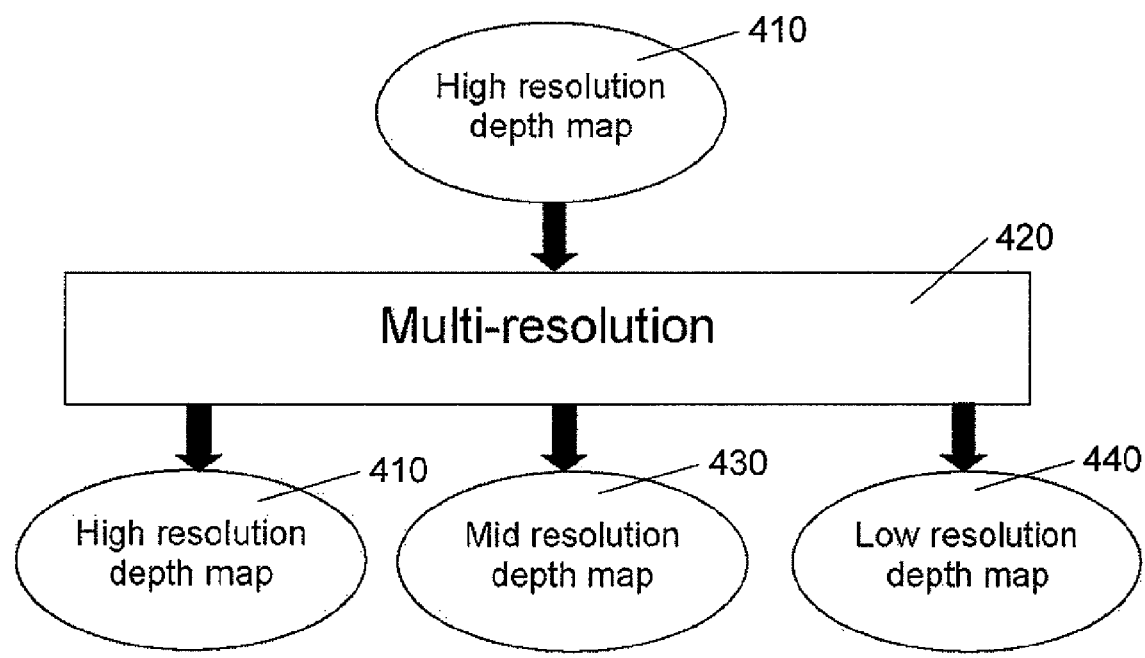
FIG. 4 illustrates a flow diagram of a multi-resolution process.

An overview of the multi-resolution process is shown generally in FIG. 4. A flow diagram 400 is shown that starts with obtaining a high resolution depth map of the scene (step 410) and processing the high resolution depth map using multi-resolution techniques (step 420) as will be described in more detail below. The multi-resolution process (step 420) comprises pyramidal processing to down-sample the high resolution depth map to produce at least a high resolution depth map 410 and to produce at least a mid/intermediate resolution depth map 430 and a low resolution depth map 440 respectively. The multi-resolution process 420 comprises dividing at least the resolution by two for each pyramidal level. Although only three levels are shown, it will be appreciated that the process 420 may include any suitable number of levels. An example of pyramidal down-sampling is shown in FIGS. 5A, 5B, and 5C.

Figure 5A:
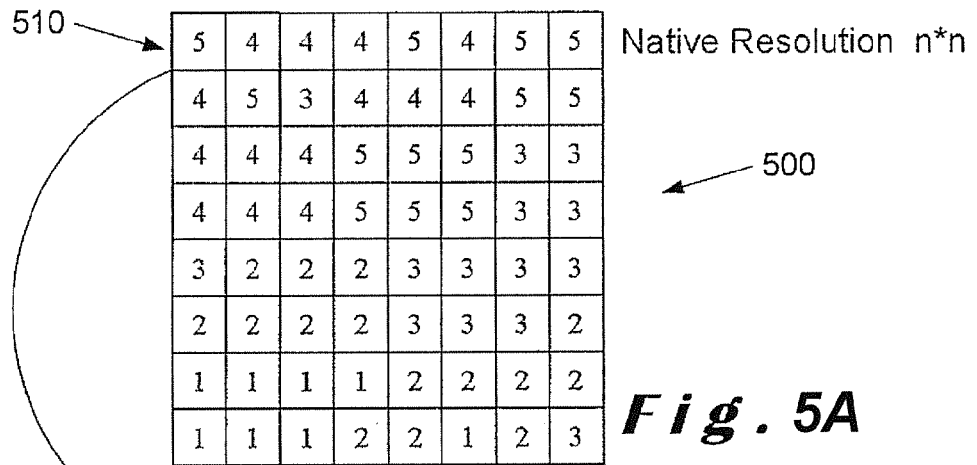
FIGS. 5A, 5B, and 5C illustrate the multi-resolution process of FIG. 4 in more detail.

In FIG. 5A, an array 500 of 8×8 pixels is shown. Each pixel has a depth value of 1, 2, 3, 4 or 5 arranged as shown. These values are given by way of example and indicate the distance of each pixel from a camera that forms part of the imaging system. In this case, the array 500 is intended to be representative of the high resolution depth map having a native resolution of n*n.

Figure 5B:
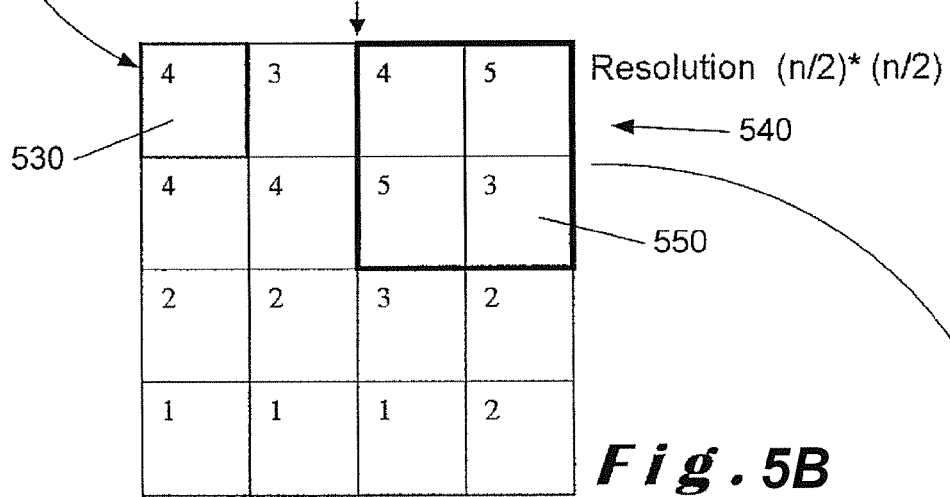

When the high resolution depth map is down-sampled to the next level, the 8×8 array is down-sampled to a 4×4 array (as shown in FIG. 5B) and the minimum depth value in each group of four pixels, for example, group 510, is kept as a single pixel 530, having a depth value of 4, in array 540. Array 540 is intended to be representative of the mid resolution level of the original high resolution depth map. In the down-sampling process, the original high resolution depth map is maintained and the mid resolution depth map is created having a resolution of (n/2)*(n/2) in that case.

Figure 5C:
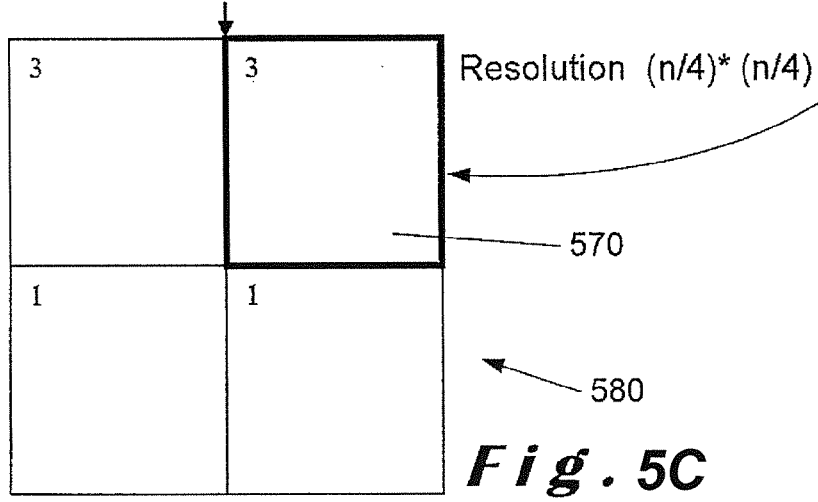

The mid resolution depth map can also be down-sampled to a low resolution depth map as shown in FIG. 5C. Here, the 4×4 array 540 is down-sampled to form a 2×2 array. One group of four pixels 550 in array 540 is shown as being down-sampled to form one low resolution pixel 570 in low resolution array 580. As before, the minimum value in each group of four pixels is kept in the low resolution depth map, in this case, 3. The low resolution depth map has a resolution of (n/4)*(n/4). It would be possible to change the resolution of array 580 to form a single pixel if required that has a resolution of (n/8)*(n/8).

It will be appreciated that the 8×8 array, 4×4 and 2×2 arrays are given by way of example only. In practical terms, each high resolution array may comprise an n*n array which can be down-sampled any number of times to a resolution (n/k)*(n/k) until it is no longer possible to down-sample.

Figure 6:
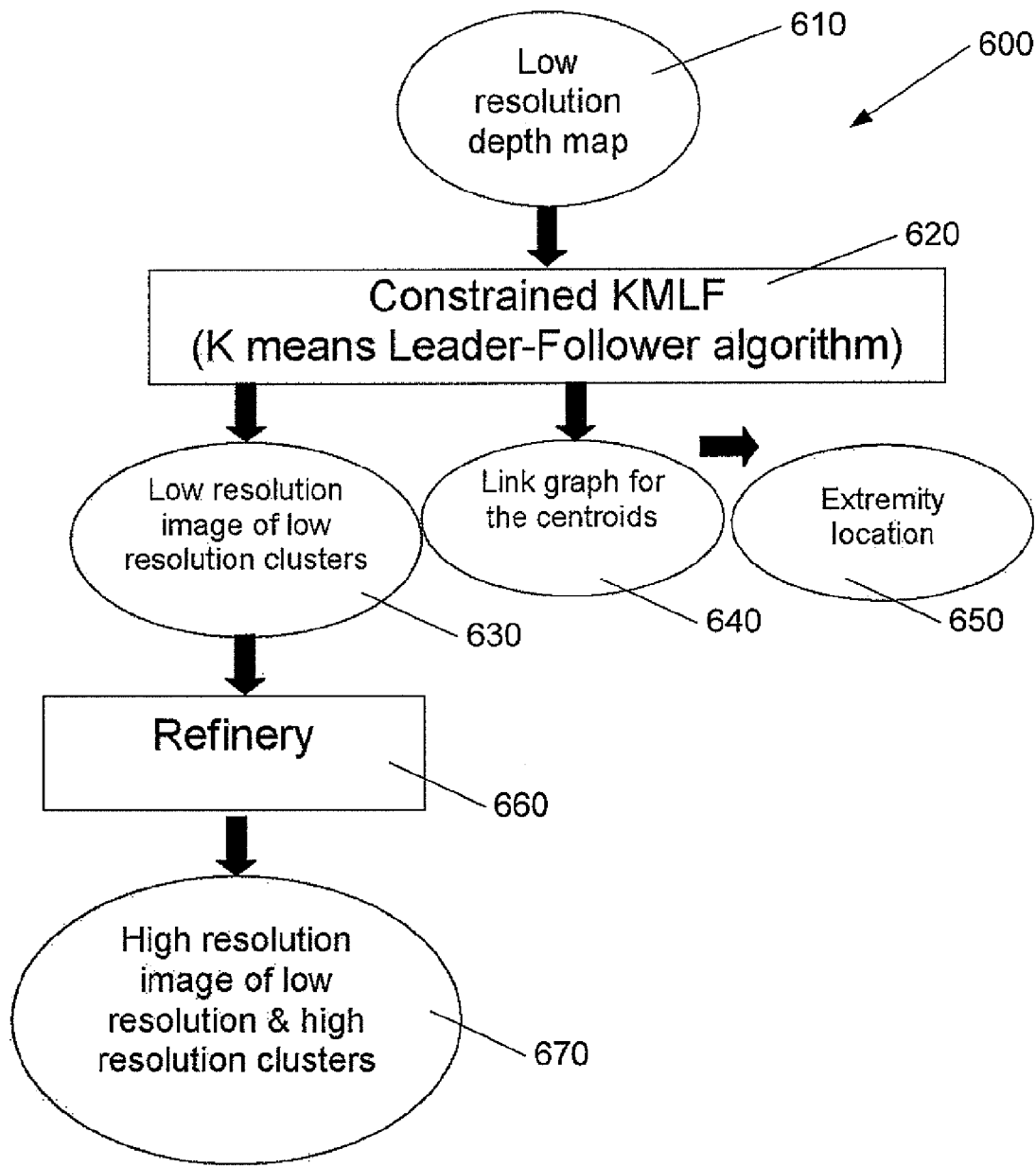
FIG. 6 illustrates a flow diagram of the use of a low resolution depth map created by the multi-resolution process of FIGS. 4 and 5.

In FIG. 6, a flow diagram 600 is shown that illustrates the steps for scene clustering. A low resolution depth map 610 forms the input to a constrained K-means leader-follower algorithm (KMLF) 620. The KMLF is a mix of known algorithms that operates to segment the scene in spatio-temporally coherent groups of pixels; the clusters (having a centroid). There are three main outputs from the KMLF 620, namely, a low resolution image 630 of low resolution clusters, a link graph 640 of centroids of each cluster, and from the link graph a extremity localisation and identification 650 for centroids connected only to a single other centroid. The link graph 640 comprises an n dimension link graph where n=3.

FIG. 7A illustrates a low resolution image comprising pixel depth values, the image having to be clustered with, for example, a constrained KMLF algorithm 620 (FIG. 6). A low resolution image 700 is shown that comprises an 11×11 array. Each pixel in the array has a depth value of 1, 2, 3, 4, or 5 as shown. Grouping the pixels into clusters where each cluster has depth values that are approximately the same is shown in FIG. 7B.

In FIG. 7B, it can readily be seen that clusters 701, 707, 708 and 710 have the same depth values. For clusters, 702, 703, 704, 705, 706 and 709, the majority of pixels in those clusters have the same depth value but there may be a few pixels having different depth values. It will be appreciated that each of these pixels having different depth values to the surrounding or adjacent pixels are effectively cut off from another cluster having the same depth value. In addition, there is a limit to the maximum size of cluster that is permitted for ease of processing.

In FIG. 7C, centroids 751, 752, 753, 754, 756, 757, 758, 759, 760 for each of clusters 701, 702, 703, 704, 705, 706, 707, 708, 709, 710 respectively are shown. The centroids can be linked in two-dimensional space as well as three-dimensional space as shown in FIG. 7D.

In FIG. 7D, the centroids 752, 753, 754, 755, 756, 758, 760 can be connected to one another as shown. Centroids 751, 757 and 709 cannot be connected as their clusters have depth values that are substantially different to those of their surrounding clusters. This is because these clusters are not 3D connected but may be 2D connected. 2D connection means that centroids are only connected in two-dimensions and 3D connection means that centroids are connected in three-dimensions. As a result, it can be seen that centroids 758 and 760 are only 3D connected one adjacent centroid in an adjacent cluster, namely, centroid 754 and centroid 756 as shown. Clusters 708 and 710 and their associated centroids 758 and 670 are therefore each indicative of an extremity.

Returning now to FIG. 6, as described with reference to FIGS. 7A, 7B, 7C, and 7D, the low resolution image 630 of low resolution clusters, the link graph 640 for the centroids and the localised extremities 650 are determined. From the low resolution image 630 of low resolution clusters, a high resolution image 670 of low and high resolution clusters is obtained using a refinery process 660.

The refinery process 660 may only be applied to clusters belonging to a ROI (not shown) defined by the three-dimensional ROI in which at least a POI is located. At start up, namely, frame 1, or if no ROI has been activated or created, the high resolution image 670 is the same as the low resolution image 630 of the low resolution clusters. Once at least a ROI is defined, clusters out of the ROI may not be refined and only those inside the ROI may be refined. Coherent moving extremity clusters out of at least a ROI can nevertheless be refined in another embodiment.

Figure 8:
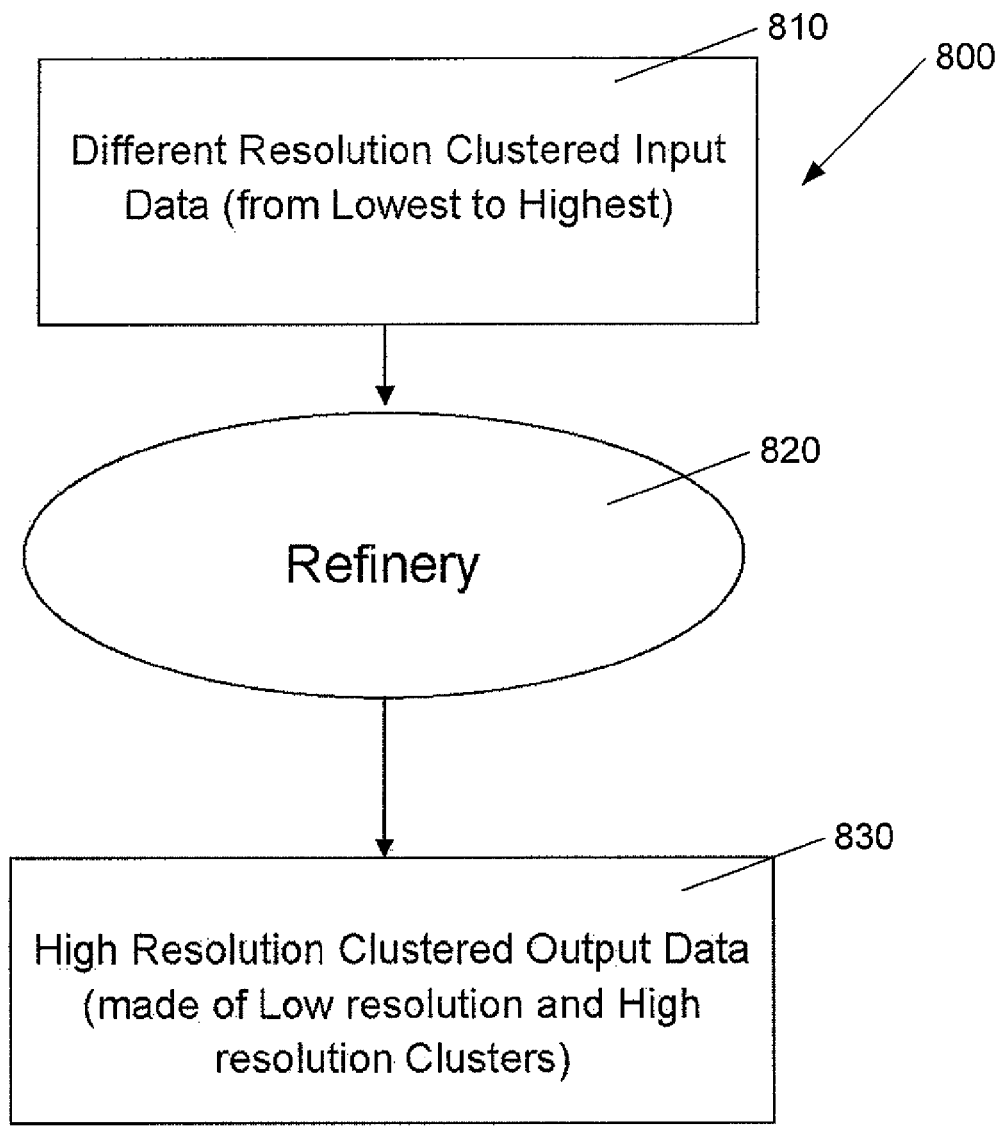
FIG. 8 illustrates a refinery process for assigning a cluster identification to a pixel.

FIG. 8 illustrates the input and outputs obtained from the refinery process 660. In FIG. 8, a flow diagram 800 is shown where different resolution clustered input data 810 is input to the refinery process 820 to provide an output of high resolution clustered output data 830. The purpose of the refinery process 820 is to sharpen up boundaries between clusters as the image increases in resolution, for example, when going from low resolution to mid resolution and then to high resolution. At each level of the pyramid, for each pixel, the refinery process defines to which cluster the pixel is really attached thereby linking the identification of the cluster to the pixel. For each pixel, it is assigned to the cluster which is the closest to it in terms of Euclidean distance for example. It will be appreciated that other methods of determining "closeness" between a pixel and a cluster can also be used. The refinery process 820 is shown in more detail in FIG. 9.

Figure 9:
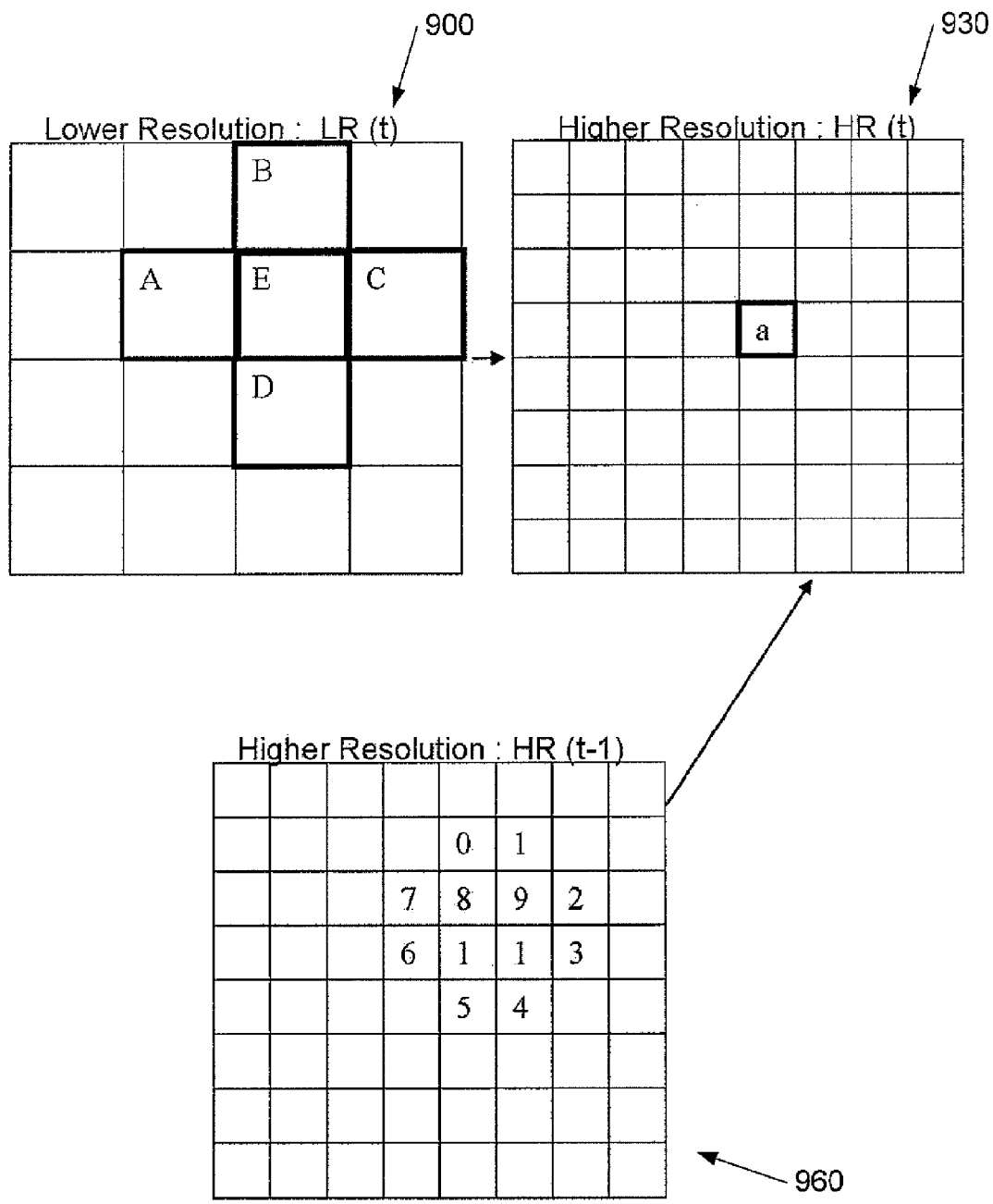
FIG. 9 illustrates the operation of the refinery process in more detail.

In FIG. 9(*a*), a lower resolution array 900 is shown for cluster identification at time t, LR(t). Five pixels are shown 'A' to 'E'. Pixel 'E' is the one of interest here. As the lower resolution array 900 is up-sampled to a higher resolution as shown by array 930 in FIG. 9(*b*) also at time t, HR(t), pixel E is no longer pixel 'E' but can be considered to be pixel 'a'. However, the identity of pixel 'a' can be one of several values as shown in array 960 of FIG. 9(*c*) at time t−1, HR(t−1).

However, for each pixel, it is assigned to the cluster which is closest in terms of Euclidean distance between the pixel and the centroid of the cluster to which it is being compared. As shown in FIG. 9 above, the cluster candidates for pixel 'a' can be expressed as one of the following:

$$ID(a)HR(t)=ID(D_{min}(V(E); V(\{A,B,C,D\}LR(t));$$
$$V(\{0,1,2,3,4,5,6,7,8,9,10,11\}HR(t-1)))$$

where

ID (a) is the identity tag of pixel 'a';

LR (t) is the lower resolution image at time t;

HR (t) is the higher resolution image at time t;

HR (t−1) is the higher resolution image at time t−1;

$D_{min}$ (V;X) is the minimum Euclidian distance between pixel 'E' and X, where X is the position of the centroid of the nearest cluster;

V(x) is the three-dimensional values of corresponding pixel the ID of which is x;

{A,B,C,D} is the pixel cluster identification candidate list in the lower resolution array 900; and {0,1,2,3,4,5,6,7,8,9,10,11} is the pixel cluster identification candidate list in the higher resolution array 960 at t−1.

In other words, the cluster identification of pixel 'a' at time t in the higher resolution array 930 is determined by the minimum Euclidean distance between the pixel 'a' and the centroid of the cluster to which it can be considered to be assigned. As given above, the cluster identification of pixel 'a' is the minimum distance as defined by:

(i) three-dimensional values of the corresponding pixel 'E' (V(E)) in the lower resolution array 900 at time t;

(ii) three-dimensional values of any one of the corresponding pixels 'A', 'B' 'C' or 'D' (V({A,B,C,D} LR (t)) in the lower resolution array 900 at time t; or (iii) three-dimensional values of any one of the corresponding pixels '0' to '11' 1V({0,1,2,3,4,5,6,7,8,9,10,11} HR (t−1)) in the higher resolution array 960 at time t−1.

Figure 10A:
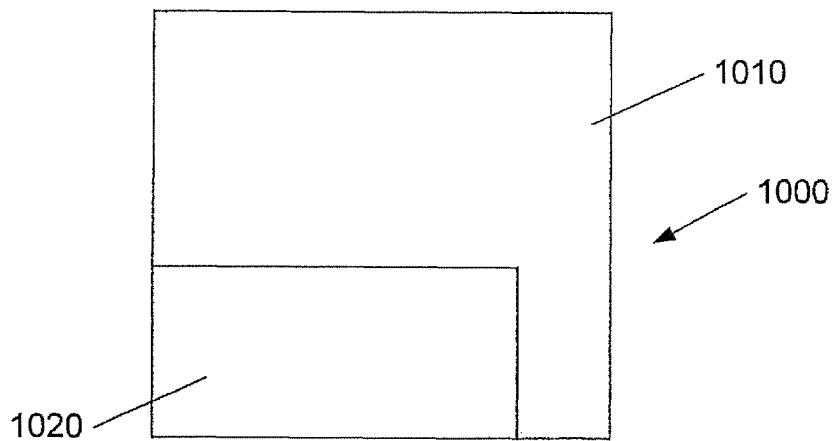
FIGS. 10A and 10B illustrate the effect of the refinery process of FIG. 8.
Figure 10B:
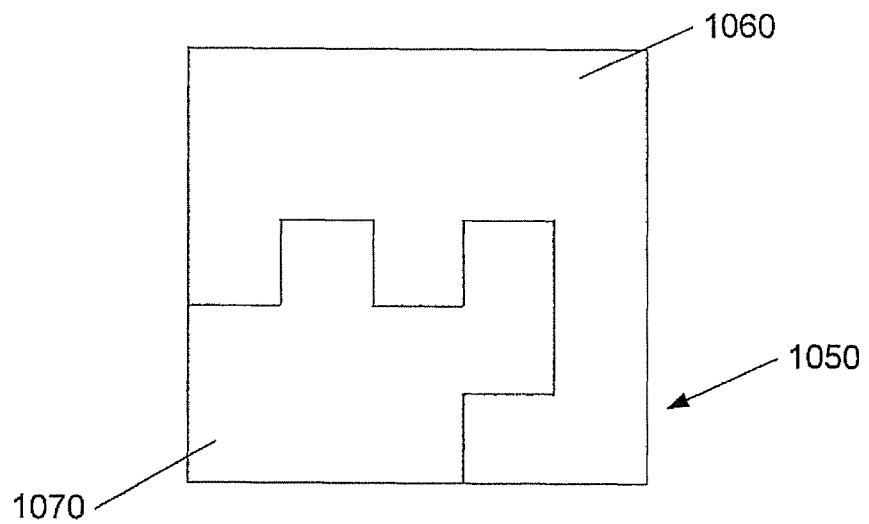

FIGS. 10A and 10B show a simple illustration of the outcome of the refinery process. In FIG. 10A, two clusters are shown, 1010, 1020 in a lower resolution image 1000. FIG. 10B shows the same two clusters 1060, 1070 in a higher resolution image 1050 after the refinery process 820 has been carried out.

In an embodiment of the refinery process, such as, that described above, pixels are not considered for processing if they have not been validated. For example, a pixel may not be validated if the infrared beam from the camera illuminating the pixel falls under a predetermined threshold, if there is bad illumination gradient, if the pixel is flagged as being part of the background or if the pixel is outside of the virtual limits of some clipping planes; the clipping planes limiting the three-dimensional space that is processed.

Figure 11:
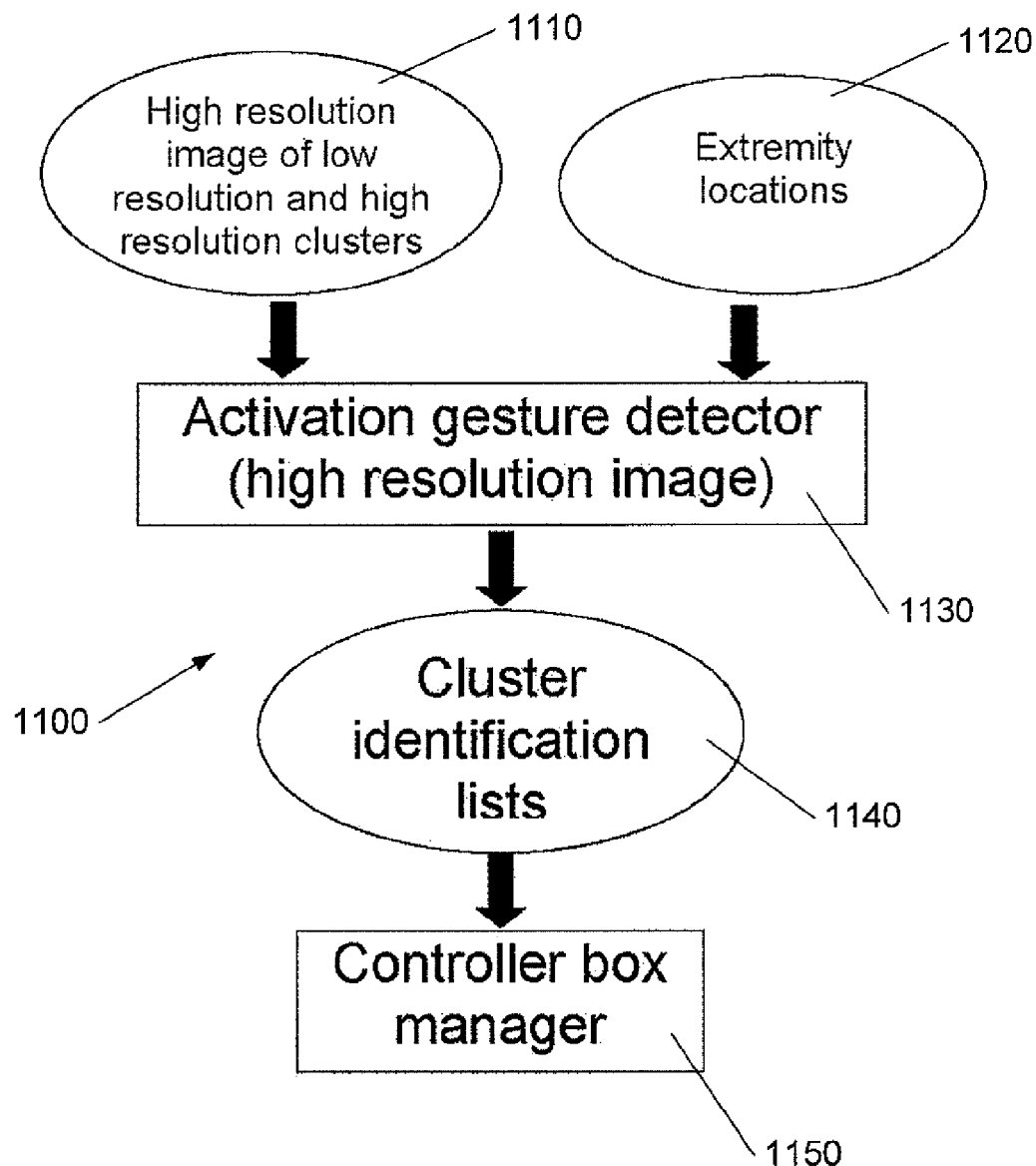
FIG. 11 illustrates a flow diagram of the use of the output of the refinery process.

FIG. 11 illustrates a flow diagram 1100 relating to an embodiment of a user interface and more especially to the detection and the identification of the POI which will support the control and/or interactions. In that embodiment, there are two main inputs to the user interface activation gesture process detector—typically at least a high resolution of low and high resolution cluster image 1110 (produced as one output of the scene clustering as described above with reference to FIG. 6) and the cluster is identified has being an extremity 1120 (also produced as an indirect output of scene clustering as described above with reference to FIGS. 6 and 7). The clustered image 1110 and the cluster extremity list 1120 are input to an activation gesture detector 1130 which looks at all the centroids of clusters that have been tagged as being extremities in the link graph 640 in FIG. 6 and which demonstrate coherent motion. Coherency of a moving centroid is determined by the age of the cluster to which it belongs and is determined by the fact that it demonstrates movement with a limited amount of noise (that is, not a jerky trajectory), the amount being under a predetermined threshold. The coherency of a moving object, in this case, a centroid of a cluster, may be, for example, determined by detecting successive changes in the direction of the POI, namely, the centroid itself, and computing some data calculation and statistics regarding the respective positions of each change in trajectory localisations as well as the ordering of the reference seed points found (at trajectory change location). In one example, a trajectory demonstrating changes in direction of a POI at each frame may be considered has being not coherent and by the way useless. In another other example, a trajectory demonstrating high speed movement in the opposite direction from frame to frame may also be useless and considered as not a coherent moving point Generally, POI movement coherency requires the movement to be within a certain range of velocity and accelerations, be performed by an existing POI for a certain amount of time, demonstrate a certain amount of direction vector co-linearity between successive trajectories in the same direction.

Activation gesture detection in step 1130 includes performing POI trajectory analysis and therefore relies on detection of changes in direction of the POI (control gesture process relies on the same process, it differs only by the input since the list of POI is restricted versus the activation gesture cluster candidate list). For each change in trajectory direction found, a reference seed point is defined as described above. All the reference seed point position are stored in the system. Continuous activation gesture recognition means continuous analysis of the trajectory. At each frame captured by the imaging system, at least the POI distance, D, to the latest known reference seed position is computed and the total length, L, of its trajectory since the gesture as been detected and within a certain number of sample is also determined. If ordering, temporal, geometrical and statistical properties in between the successive reference seed points correspond to those defining a gesture, the gesture is then recognised instantaneously, and the memory storing the reference seed points refreshed.

An activation gesture detector 1130 makes a real time analysis of the trajectory of POI candidates that meet the criteria of being an extremity and in coherent motion in order to determine if they match the activation gestures expected. Such types of activation gestures will be described in more detail below. The activation detector 1130 carries out a trajectory analysis of centroids that are considered to be at least extremities in the field of view so that an expected activation gesture can be detected. Once the expected activation gesture has been detected, a ROI is created within the field of view. The POI candidate (for example, a cluster centroid) that produces the activation gesture then becomes the master POI in the created ROI. Additionally, the activation gesture detector produces a list of clusters identified as being POIs performing interaction, step 1140, for at least one cluster (POI candidate) that has made at least one of a predefined list of activation gestures.

A controller box manager (ROI manager) 1150 uses the identified POI in the cluster list, that is, the identification of the corresponding centroid in each case, to check that the three-dimensional position of the centroid is far away enough from an already existing ROI, if multiple ROIs are allowed in a particular user interface application, and/or if ROI re-creation is allowed. Re-creation is a parameter that may be activated for a single ROI instance and is applied if and only if the currently existing ROI does not have any pointers and if an activation gesture is made out of the existing ROI. Pointers are considered to be points of interests that have been identified from an activation gesture or after the activation gesture but the position of which is within the ROI.

In addition, the centroid that has made the activation gesture may become the master pointer in the created ROI under the control of the ROI manager 1150. If a subsequent coherent moving extremity enters the ROI, it may become another POI according to the number of POIs allowed in that ROI. The ROI manager 950 outputs a list of ROIs and a list of POIs for each ROI. The POIs may be flagged as being a master POI or not. The ROI manager uses the identification of each POI that belongs to the corresponding ROI to manage that ROI with respect to time.

It is to be noted that the ROI is a n-dimensional space, the dimensions of which are predetermined in accordance with the particular system. In another embodiment, the dimensions can be changed dynamically, for example, if a POI tries to move out of a ROI. It is also possible to define diagonal extremities with at least two POIs within a ROI. In addition, a ROI which has no POI activated inside it for a predetermined duration, D1, is deactivated; and is then destroyed if it remains deactivated for a further predetermined duration, D2.

An activated POI is one that is an extremity of the RAG and exhibits coherent motion.

An activated POI which does not move for a predetermined duration, D3, is deactivated. If it still deactivated for a further predetermined duration, D4, it is then destroyed.

A POI which has moved out of the ROI is deactivated once it crosses the boundary to the ROI. It is destroyed if it still deactivated for a predetermined duration, D5. However, the POI can be reactivated if a coherent moving extremity (centroid) enters back into the ROI (through a backdoor region) at a position close to the one where the previous POI left and before the D5 period expires. A backdoor region is a region where a POI re-enters the ROI at a location near to where it left the ROI for a predetermined duration controlled by a threshold timer.

Turning now to gesture controls, it will be appreciated that there may be many gestures used as control signal but only 'circle', 'wave', 'super wave', 'swipe', 'push', 'pull', 'still', 'click' and 'pointing' will be described.

Figure 12:
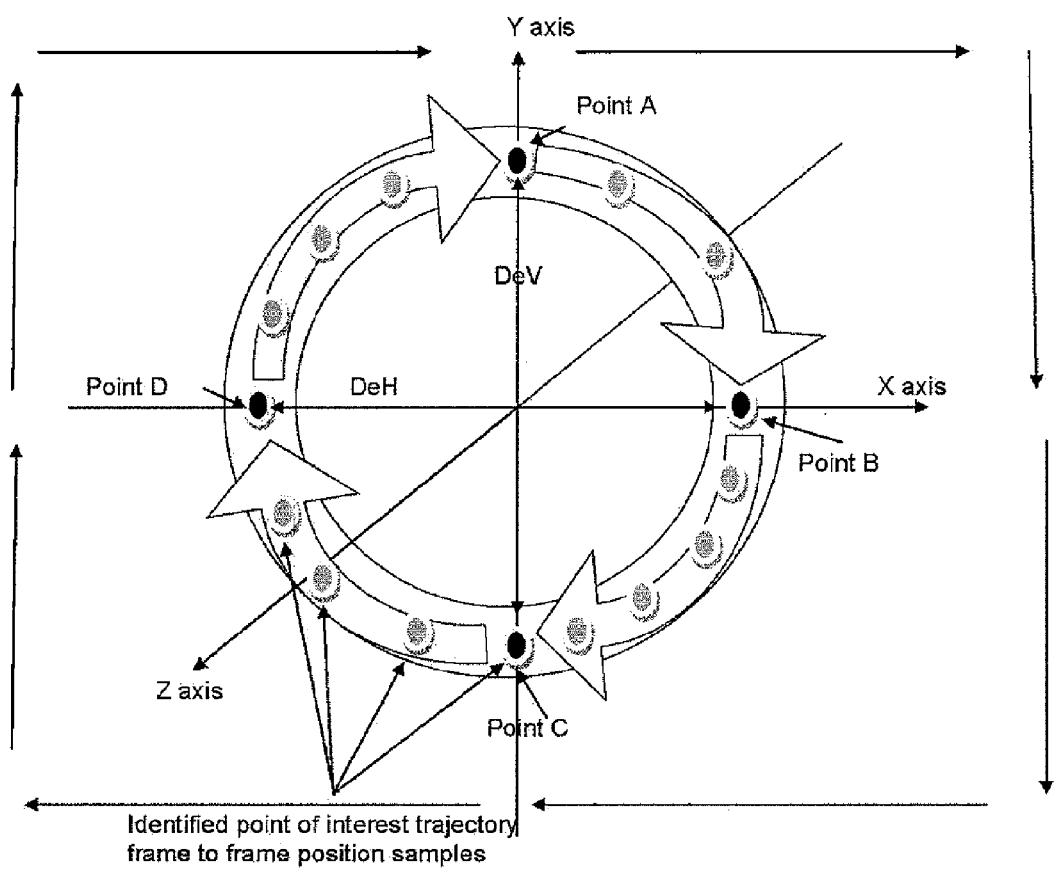
FIG. 12 illustrates trajectory based 'circle' gesture recognition.

Having determined the presence of an extremity of a user or object that can act as a POI within the field of view, the 'circle' is used as an activation gesture, for example, to indicate to the imaging system that the interface is to be activated or switched on. It should be noted however, that an activation gesture may not necessarily launch or activate the user interface in accordance with the present invention, but may only determine which POI is to interact with the interface. FIG. 12 illustrates trajectory based 'circle' gesture recognition.

In FIG. 12, the trajectory of the POI is determined from frame to frame as shown by the centroid positions. Starting at any one of the points, including A, B, C or D and moving in a clockwise direction as shown, the trajectory of the centroid is shown as it moves around the 'circle'. As the centroid moves around the 'circle', the following changes in trajectory direction with respect to the X- and Y-axes are detected:

(i) from point D to point A, there is a change in the direction of the +Y-axis;

(ii) from point A to point B, there is a change in the direction of the +X-axis;

(iii) from point B to point C, there is a change in the direction of the −Y-axis; and (iv) from point C to point D, there is a change in the direction of the −X-axis.

The 'circle' is detected by alternative changes of discrete readings point of a trajectory changes in the direction of the +Y-axis, the +X-axis, the −Y-axis and the −X-axis of the centroid to determine the number of quarter circles detected. A POI performing at least four quarter circles is considered to be performing a circle and the circular coefficient can be determined by using the at least four reference seed points at which changes of direction have been detected. The 'circle' is detected when at least four consecutive quarter circles are detected in a single trajectory of the centroid. The changes in direction of the centroid described above are detected together with the distances between points A and C, DeV, and between points B and D, DeH, to determine whether a centroid has executed the activation gesture of a 'circle'. Parameters that define a 'circle' include: at least four successive quarter circles detected within the same direction, for example, clockwise or anti-clockwise; a circle size of predetermined dimensions; a circle performed over a certain duration; and a circle having a certain circular coefficient as described above.

Figure 13:
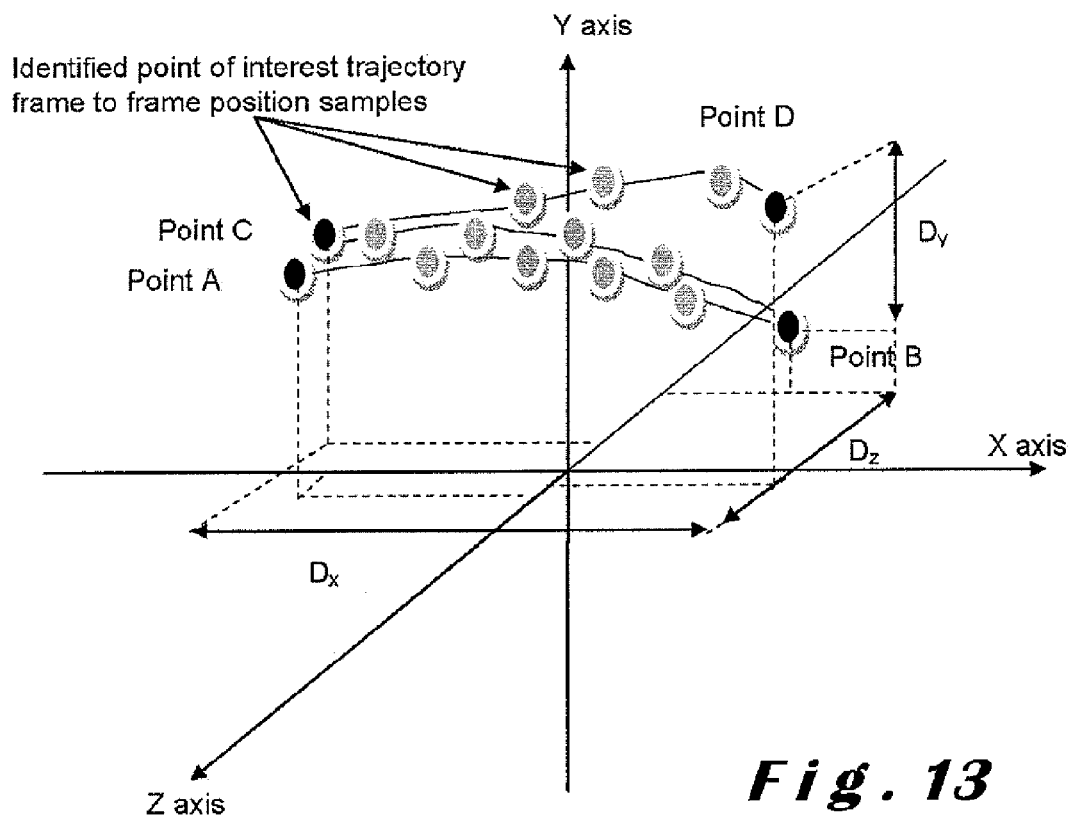
FIG. 13 illustrates trajectory based 'wave' gesture recognition.

FIG. 13 illustrates trajectory based 'wave' gesture recognition. The trajectory of the POI is determined from frame to frame as shown by the POI positions. Here, points A, B, C and D correspond to reference seed points (extremities of the wave gesture trajectory in that case) of the trajectory of the POI as it executes the 'wave'. Starting at point A, the POI travels a distance to point B; a nearly similar distance back to point C; and a nearly similar distance to point D. As shown, there are changes in distance travelled by the centroid in respect of the X-, Y- and Z-axes of $D_X$, $D_Y$ and $D_Z$ respectively. Detection of the reference seed points A, B, C and D and distances travelled provide an indication that a 'wave' gesture has been made.

The 'wave' is detected by opposite changes in direction between two successive reference seed points of the trajectory. The distance D1 between two consecutive reference seed points corresponds to a half wave. Several kinds of reference seed points can be determined according to the properties of the change in direction. Each gesture may be a combination with respect to time of several kinds of reference seed points. For example, a change in the Y-direction can be a reference seed point called "Kind A" and a change in the X-direction can be a reference seed point called "Kind B" and so on. Another distance D2 is accumulated as long as it increases the number of half waves. If this other distance D2 falls within a predetermined range and that optionally the motion of the centroid is within a predetermined velocity range, the 'wave' is determined to be detected if and only if the number of consecutive half waves is also greater than another predetermined value, that is, at least two half waves.

The 'super wave' differs from the 'wave' in that the distance between the two consecutive end points may be greater than that for the 'wave' and that the velocity of the centroid may also be greater than that for the 'wave' and that, for example, the number of consecutive half-waves is greater than that for the 'wave'.

Figure 14:
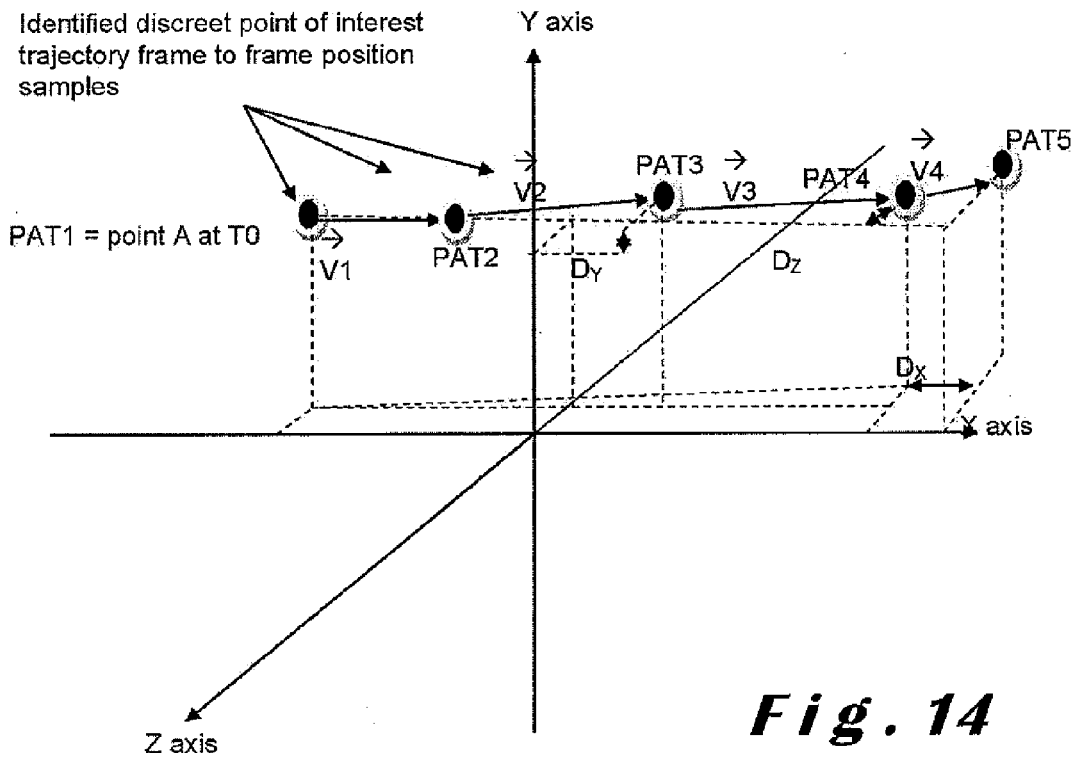
FIG. 14 illustrates trajectory based 'swipe' gesture recognition.

FIG. 14 illustrates a trajectory based 'swipe' gesture recognition. The POI moves from left to right in the execution of a 'swipe' gesture, the trajectory of the POI being determined from frame to frame as shown by the centroid positions at PAT1, PAT2, PAT3, PAT4 and PAT5. The position of the POI at each frame is shown as PAT1, PAT2, PAT3, PAT4, PAT5 and the velocity vector of the POI at each frame is shown as V1, V2, V3 and V4 respectively. PAT1 corresponds to the point A at $T_0$ for example. As shown, the distances with respect to the X-, Y- and Z-axes, $D_X$, $D_Y$ and $D_Z$, may also vary from frame to frame as the POI moves from the first position, PAT1, to the last position, PAT5.

The 'swipe' is detected if the velocity of the POI exceeds a predetermined threshold and that the centroid has a linear trajectory. The distance covered by the POI in the linear trajectory also needs to exceed a predetermined threshold.

Figure 15:
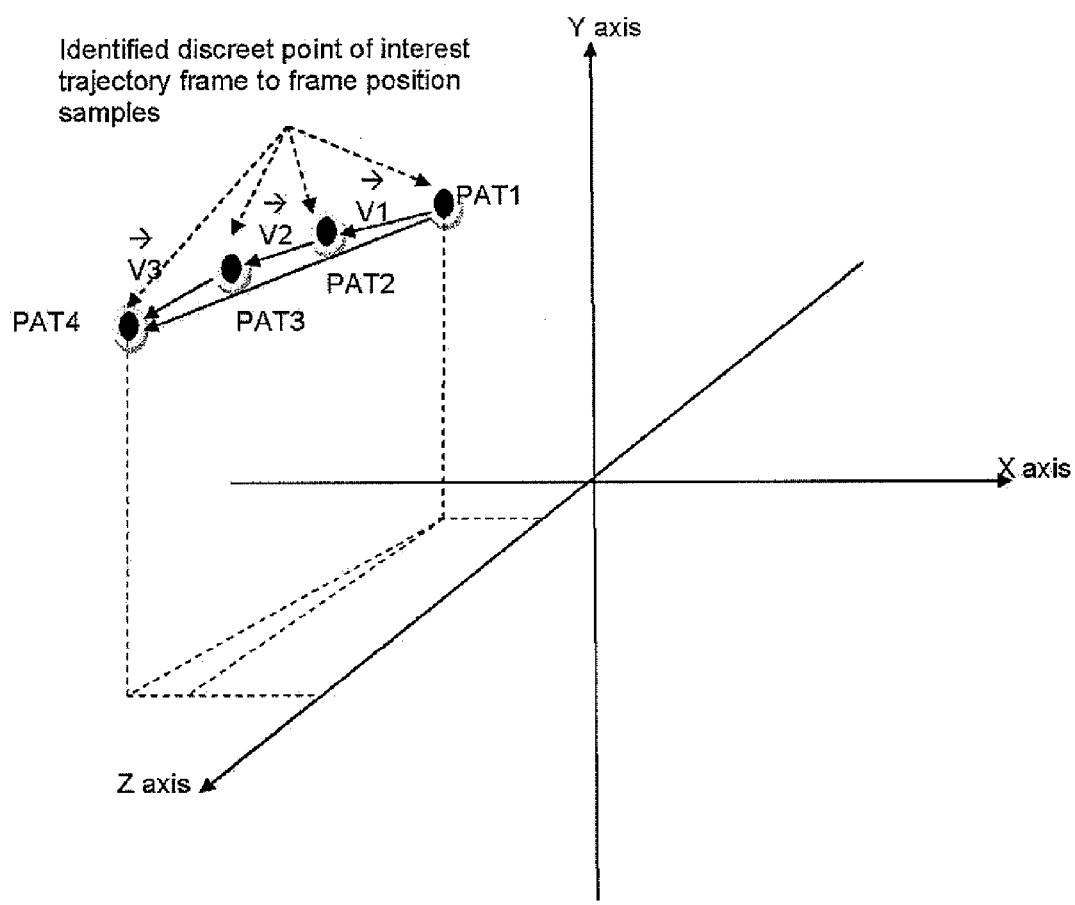
FIG. 15 illustrates trajectory based 'push'/'pull' gesture recognition.

FIG. 15 illustrates trajectory based 'push' or 'pull' gestures (both being opposed). The POI moves from positions PAT1 to PAT4 in the 'push' gesture and from PAT4 to PAT1 in the 'pull' gesture, the trajectory of the POI being determined from frame to frame as shown by the POI positions at PAT1, PAT2, PAT3 and PAT4. The velocity vector of the POI at each frame is shown as V1, V2 and V3 respectively. As before, PAT1 corresponds to the point A at $T_0$.

The 'push' is effectively a kind of 'swipe' but in the depth or Z-axis, that is, in the direction towards the camera. In particular, the position of the POI with respect to the X- and Y-axis does not change substantially.

The 'pull' is effectively the same as a 'push' but in the direction away from the camera.

Figure 16:
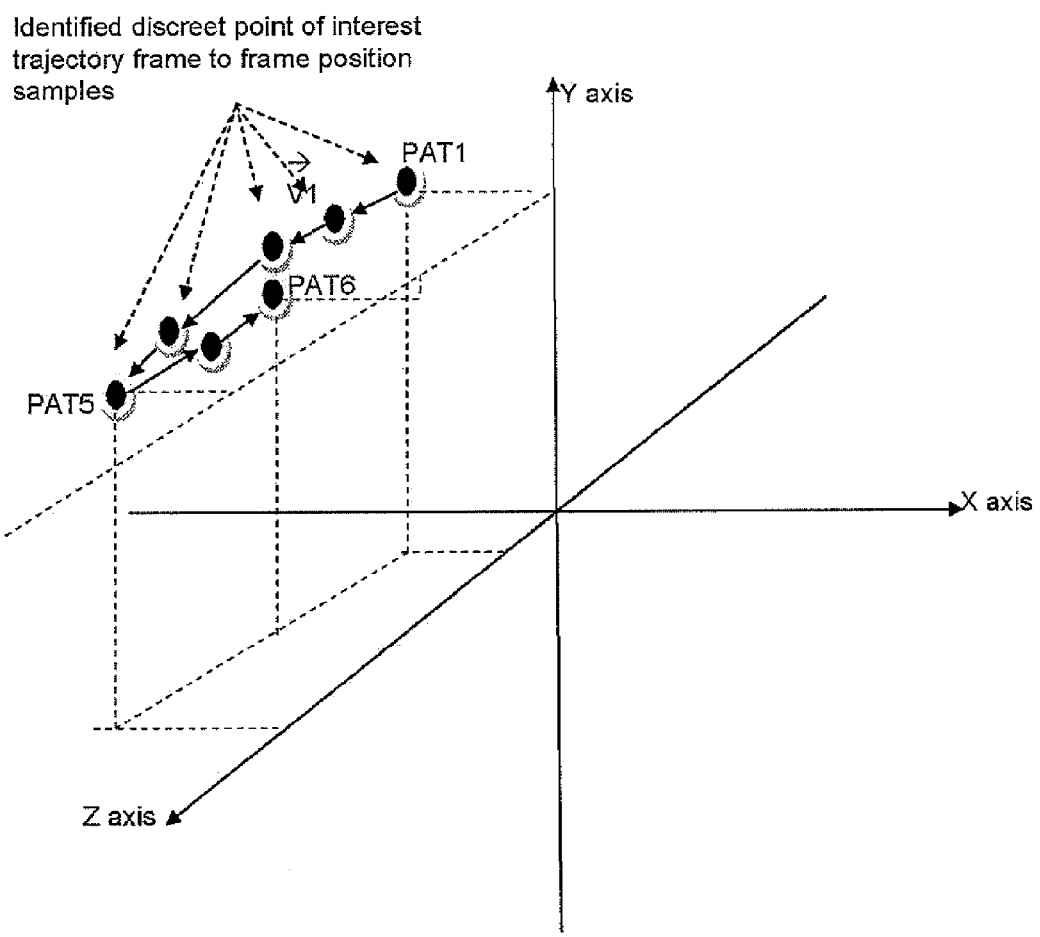
FIG. 16 illustrates trajectory based 'click' gesture recognition.

FIG. 16 illustrates trajectory based 'click' gesture recognition, the trajectory of the POI being determined from frame to frame as shown by the centroid positions at PAT1, PAT2, PAT3, PAT4 and PAT5. PAT1 corresponds to the point A at $T_0$. In this case, the POI moves along the Z-axis from PAT1 through to PAT5 and then returns to PAT6. Only the velocity vector V1 is shown in FIG. 16 since velocity and/or acceleration are properties computed from frame to frame for the POI any time.

'Pointing' gesture corresponds to the relative position of the POI with respect to at least the dimensions of the ROI with which it is associated. The POI can be the master POI or a subsequent POI.

An additional gesture is 'still' where the POI remains in a predetermined position during at least a predetermined duration and within the corresponding ROI.

Generally, gestures are detected by computing basic geometrical, temporal and POI trajectory properties in between successive reference seed points, each reference seed point being a position at which different kind of trajectory property has been detected as described above. Gestures are also determined using reference seed point ordering analysis.

Figure 17:
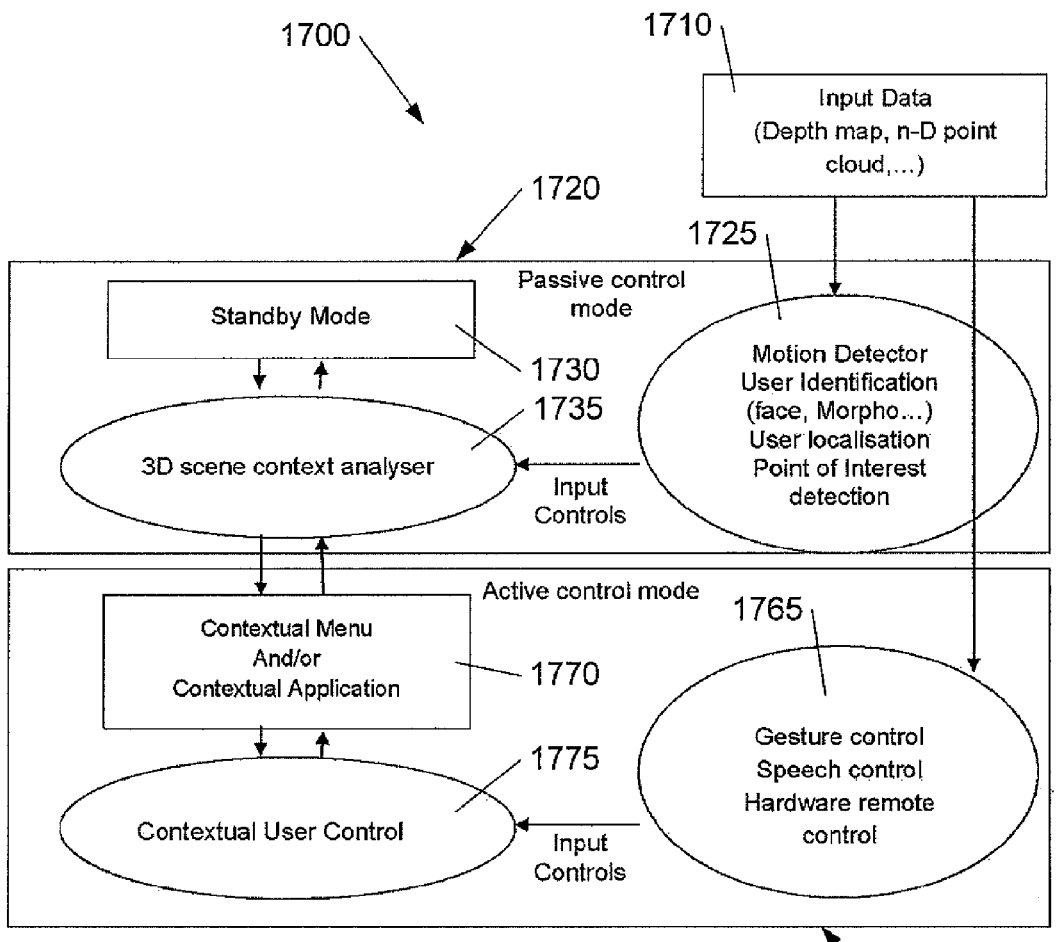
FIG. 17 illustrates a flow diagram of a user interface navigation system.

FIG. 17 illustrates a flow diagram 1700 of a user interface navigation system. The system may operate in two modes, namely, a passive control mode, as indicated by box 1720, and an active control mode, and indicated by box 1760. Input data, box 1710, is used in both the passive and active control modes as shown, the input data forming an input for a motion detection, user identification, user localisation and POI detection module 1725, and a gesture control, speech control and hardware control module 1765.

In the passive control mode, the navigation system may operate in a standby mode, box 1730, if no input data and none of processes in step 1725 are triggered as an event that puts the system into the active control mode. A three-dimensional scene context analyser module 1735 may determine whether the system is to be activated or to remain in the standby mode. Module 1735 receives input controls from the module 1725, the input control being typically "stay or switch in standby mode" or "stay or switch in activated mode". For example, a user entering a room may also enter the field of view of the camera and may generate motion that will be identified in step 1725. The identified motion effectively requests the navigation system, which was in standby mode, to switch in activated mode, by way of a three-dimensional scene context analyser in module 1735, which interacts with a contextual menu and/or contextual application module 1770 of the activated mode of the system. For example, when switching to activated mode, the system may display on a screen a main menu of a graphical multimedia interface. Module 1770, in turn, interacts with a contextual user control module 1775. Module 1775 receives input control signals from module 1765, the input control being typically natural gesture control allowed to interact with the GUI. The contextual menu and/or contextual application module 1770 can take many forms and provides interface feedback for a user. For example, an animated figure may be used to indicate the gesture that is required to interact with the contextual menu and/or contextual application module 1770.

Figure 18:
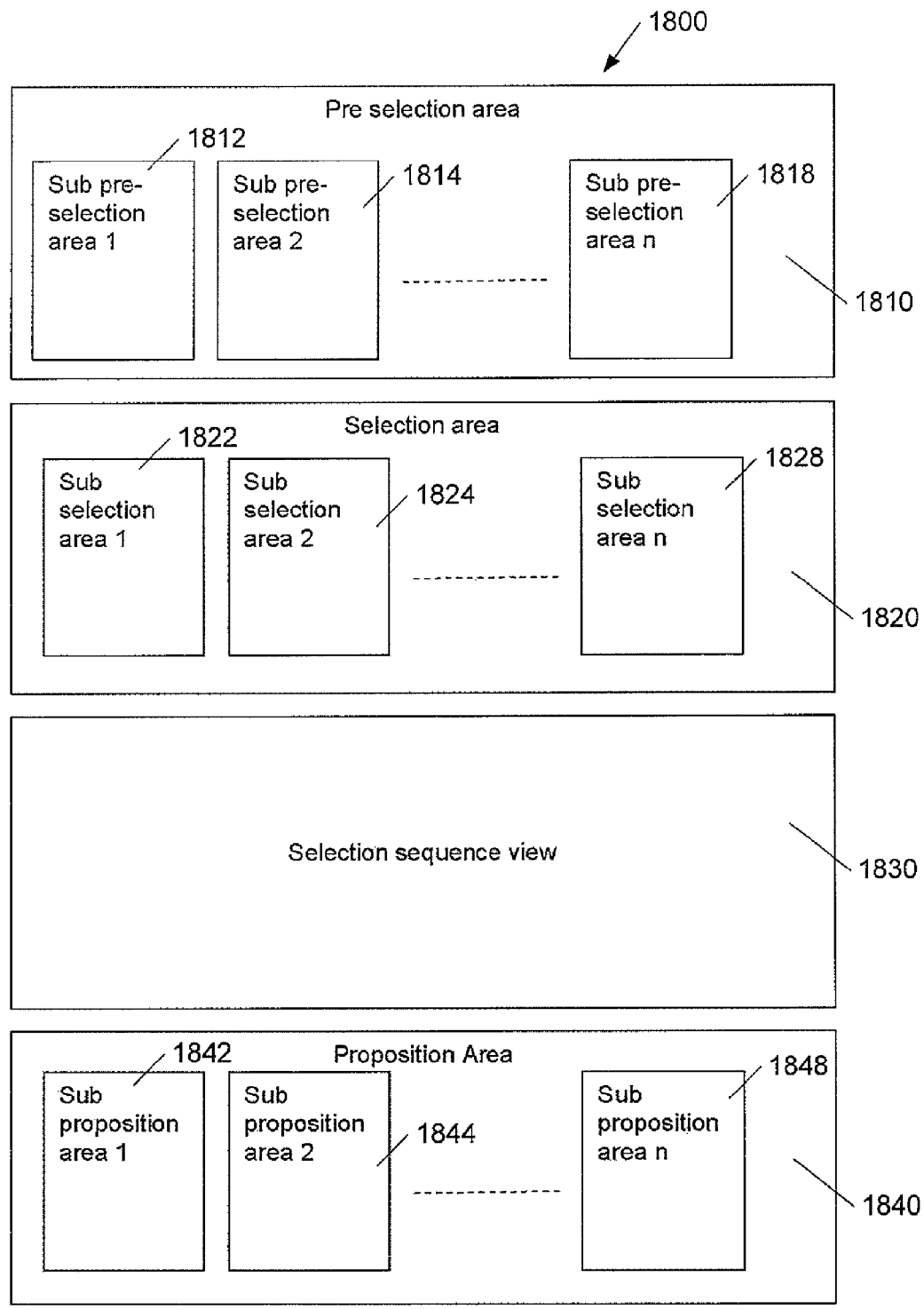
FIG. 18 illustrates a virtual keyboard main frame.

FIG. 18 illustrates a virtual keyboard main frame 1800, which can be a contextual application launched by module 1770 of FIG. 17. The main frame 1800 comprises a pre-selection area 1810, a selection area 1820, a selection sequence view area 1830, and a proposition area 1840. The pre-selection area 1810 comprises n sub pre-selection areas

1812, 1814, . . . , 1818 in which are located icons or elements in various categories that are to be selected by the user. Typically, the elements are grouped according to the nature of the characters. The selection area 1820 comprises n sub selection areas 1822, 1824, . . . , 1828 in which are located a selection of icons or elements relating to a particular category that has been selected by the user in the pre-selection area. The selection sequence view area 1830 is where the selections made by the user are displayed. The proposition area 1840 comprises n sub proposition areas 1842, 1844, . . . , 1848 where suggestions are put forward to the user for the last selected sequence put in the selected sequence view area 1830. An implementation of a virtual keyboard is shown in FIG. 19.

Figure 19:
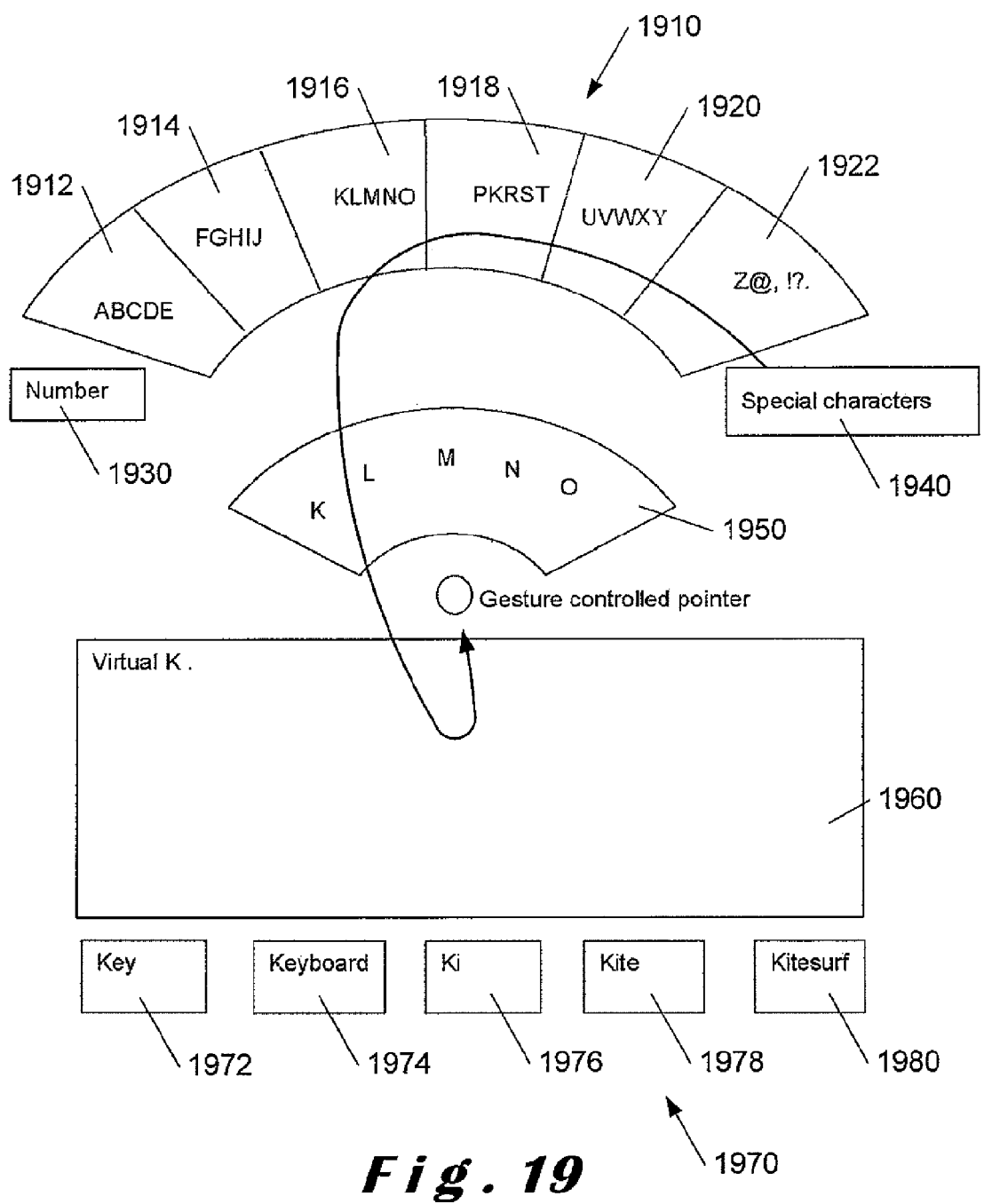
FIG. 19 illustrates a preferred embodiment of a virtual keyboard.

In FIG. 19, a particular arrangement of a virtual keyboard 1900 is shown. The keyboard 1900 comprises an area 1910 in which groups of characters are displayed. Each group of characters 1912, 1914, 1916, 1918, 1920, 1922 are individually selectable and the number of groups of characters may vary. On the left hand side of area 1910, an area 1930 is provided for allowing numbers to be displayed in the central pre-selection area 1910, and on the right hand side of area 1910, an area 1940 for special characters is provided. Areas 1910, 1930 and 1940 correspond to pre-selection areas 1812, 1814, . . . , 1818 as described above with reference to FIG. 18.

Area 1950 corresponds to selection area 1820 in FIG. 18 and is shown here with characters K, L, M, N, O as being options for selection, each characters K corresponding to one of the sub selection areas 1822, 1824, . . . , 1828 (FIG. 18). Area 1960 corresponds to the selection sequence view area 1830 of FIG. 18, and area 1970 corresponds to the proposition area 1840 with areas 1972, 1974, 1976, 1978, 1980 corresponding to the sub proposition areas 1842, 1844, . . . , 1848. It will be appreciated that the number of characters may vary in accordance with some predetermined rules.

In FIG. 19, area 1916 has been selected to provide the letters K, L, M, N, O in selection area 1950. The letter K has been selected and is present in the selection sequence view area 1960. As the letter K has been selected, various options are proposed in the proposition area 1970. When another letter is selected, either from the current characters in the selection area 1950 or from a new set of characters selected from the pre-selection area 1910 and present in the selection area 1950, the proposals in the proposal area 1970 will be updated accordingly.

It will be appreciated that if the number area 1930 or the special character area 1940 is selected, numbers or special characters will be displayed in the selection area 1950 for selection (not shown).

Although a keyboard having alphanumeric and special characters is shown in FIG. 19, it will be appreciated that the keyboard may have other symbols or characters instead of or in addition to the alphanumeric and special characters.

In the particular embodiment described above, user experience is improved as the necessary gestures to be performed are natural, intuitive and painless. For example, if considering that positioning the gesture controlled pointer onto a sub pre-selection of 1930 or 1940 automatically updates the view of 1910, then pointing a sub pre-selection of 1970 automatically updates the view of 1950, and then pointing a sub selection of 1950 automatically updates the selection view 1960. Similarly, scrolling down using the pointer, and optionally when pointing to one of the proposition elements 1970, using such a virtual keyboard requires a single gesture (i.e. the pointing) to be performed, and only nearly up and down (only backward and forward) movements performed by the user.

In a less efficient embodiment, element pre-selection or selection or proposition validation may be performed by pointing at the desired element for a predetermined period of time that is managed by a timer, or pointing a desired element and performing at least one other natural gesture such as a 'click' gesture described above.

Figure 20:
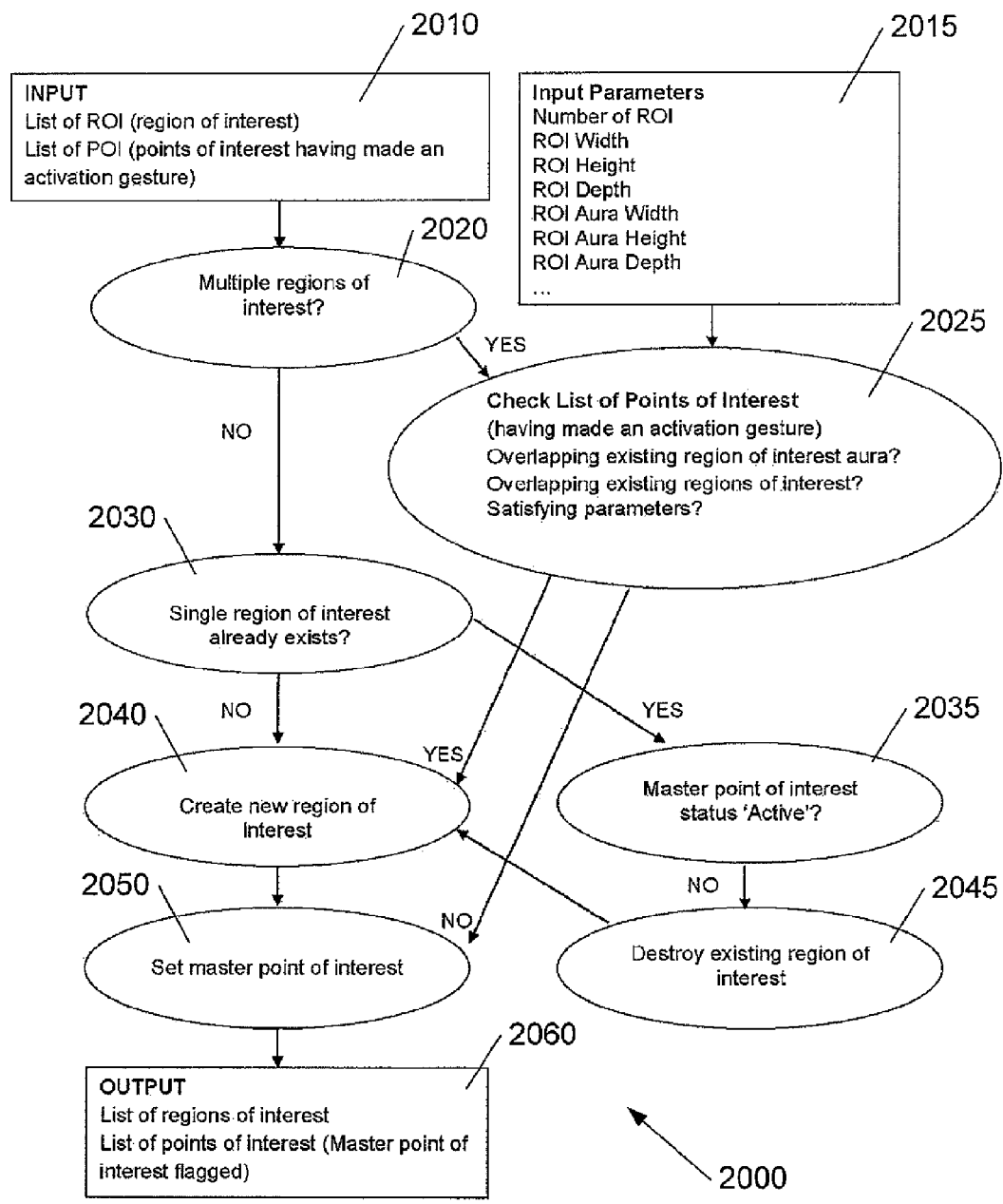
FIG. 20 illustrates a flow diagram for region of interest (ROI) management.

FIG. 20 illustrates a flow diagram 2000 for a ROI management. An input 2010 is provided that comprises a list of ROI candidates and a list of POI candidates (that is, clusters that have made an activation gesture). The input 2010 is checked to determine if there are multiple regions of interest allowed (step 2020). If only one ROI is allowed, then the system checks if a ROI already exists within the system (step 2030). If no ROI already exists, a new ROI is created (step 2040) based on at least the first ROI candidate, and for that new ROI an associated master POI is set (step 2050). The output 2060 then comprises refined lists of regions of interest and points of interest with potentially at least a master POI flagged.

If multiple regions of interest are allowed, then the system checks if the ROI candidates are valid (step 2025) using input parameters 2015 which comprise the number of regions of interest allowable and at least the dimensions of each ROI. If the input parameters 2015 of module 2025 are satisfied, and if ROI candidates do not overlap any existing ones, then a new ROI is created from at least the first ROI candidate. An associated master POI is also set (step 2050).

Figure 21:
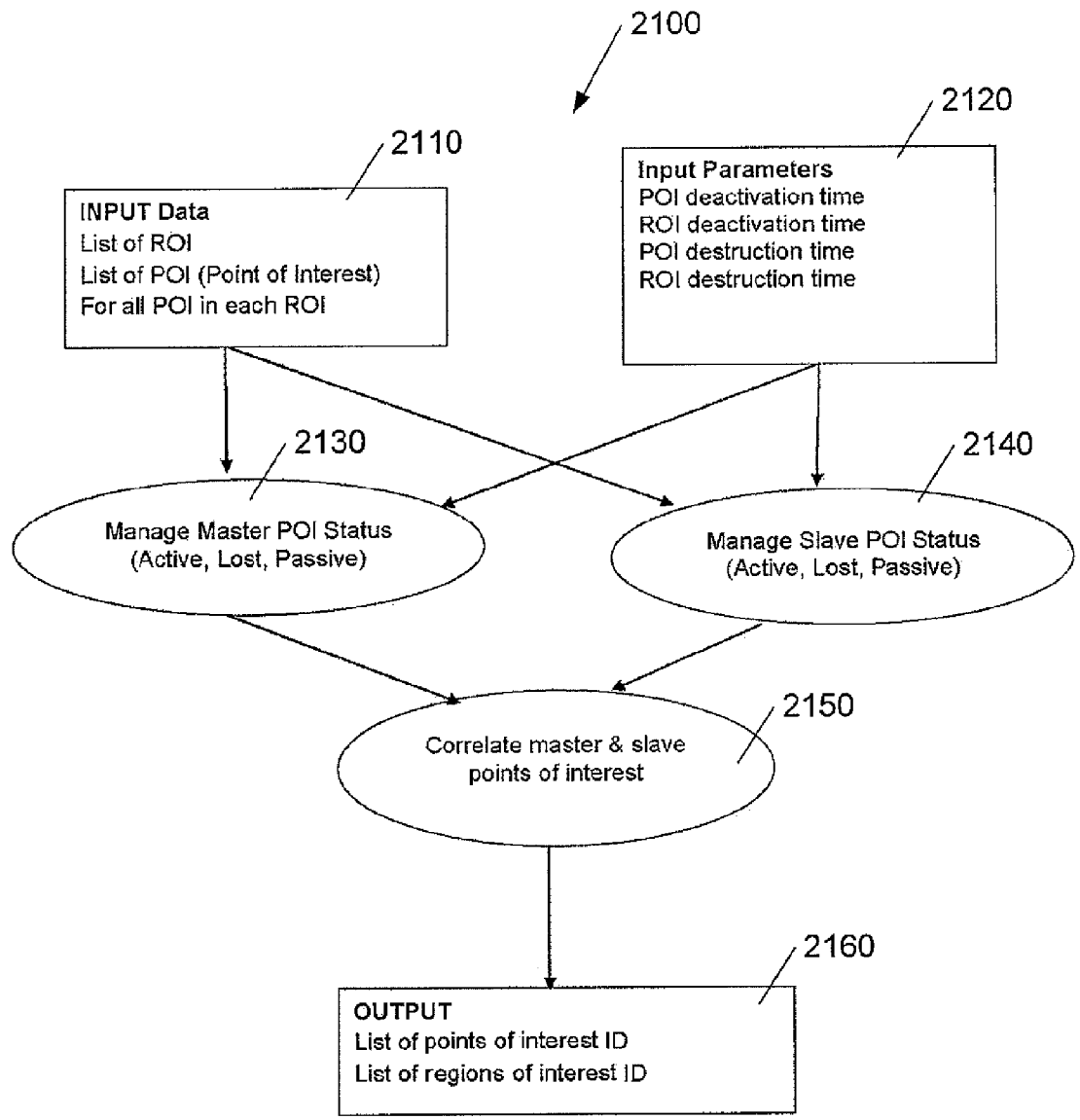
FIG. 21 illustrates a flow diagram for POI management.

In addition, if a single ROI is allowed and already exists, then a check is made to determine if the status of the master POI in that ROI is active (step 2035). If the master POI is not active, the existing ROI may be destroyed (step 2045) and a new ROI is created (step 2040) relative to the ROI candidate and its associated master POI FIG. 21 illustrates a flow diagram 2100 for POI management. Input data 2110 and input parameters 2120 are provided to manage master POI (step 2130) and slave POI (step 2140). Typically, but not exclusively a master POI is the POI that as performed the activation gesture and to which a ROI is attached. In some other embodiments, master POI and slave POI status may be exchanged according to some predetermined rules. For example, if the master POI is lost, a slave POI may take the status of the master POI. The outputs from each of steps 2130 and 2140 are used to correlate master and slave points of interest (step 2150), the result of this is to provide an output 2160 that comprises a new list of identified points of interest and a new list of identified regions of interest. The correlation of the master and slave points of interest may include deactivating points of interest that are no longer active or useful.

Figure 22:
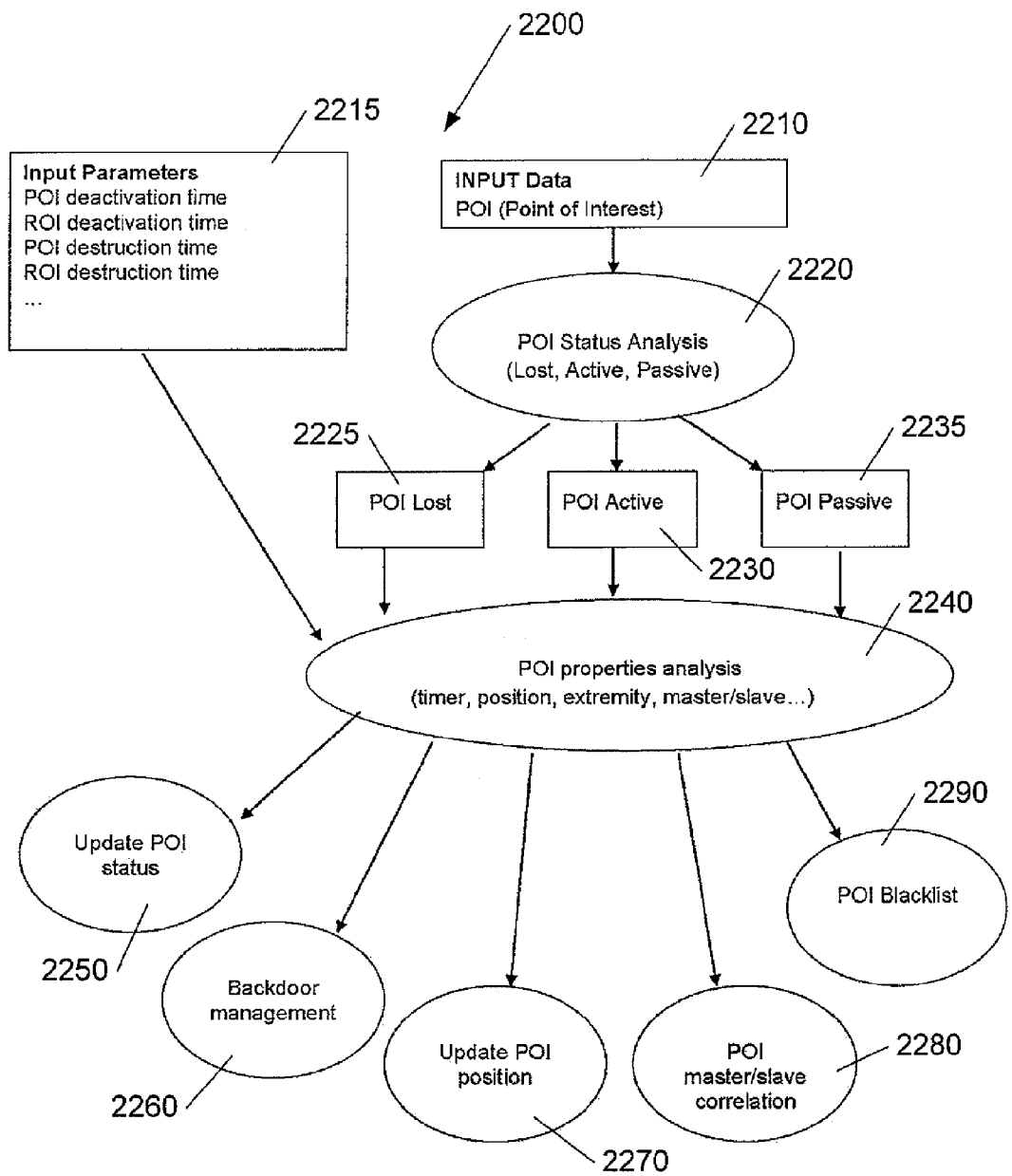
FIG. 22 illustrates a flow diagram for the operation of a POI manager.

FIG. 22 illustrates a flow diagram 2200 for a POI management process. Input data 2210, namely, a POI is applied to a POI status analysis process 2220, where the outputs are either POI lost 2225, POI active 2230 or POI passive 2235. These outputs are applied to a POI properties analysis process 2240 together with input parameters 2215 including as for example several timer values. The properties analysis 2240 evaluates properties, such as, timer (length of time in current status), position, extremity, and whether the POI is a master or a slave etc. From the properties analysis 2240, one or more of the following outputs are provided: update the POI status 2250; backdoor management 2260, update POI position 2270; POI master/slave correlation 2280; and POI blacklist 2290. A POI blacklist is a list containing the identification of points of interest that are not useable in a particular ROI. For example, a POI that has moved out of another ROI may be de-activated and then be entered on the blacklist. Such a POI may be moved off the blacklist if it becomes disassociated from the other ROI after a predetermined duration, and then can potentially be associated with the current ROI if it satisfies parameters associated with the current ROI.

Figure 23:
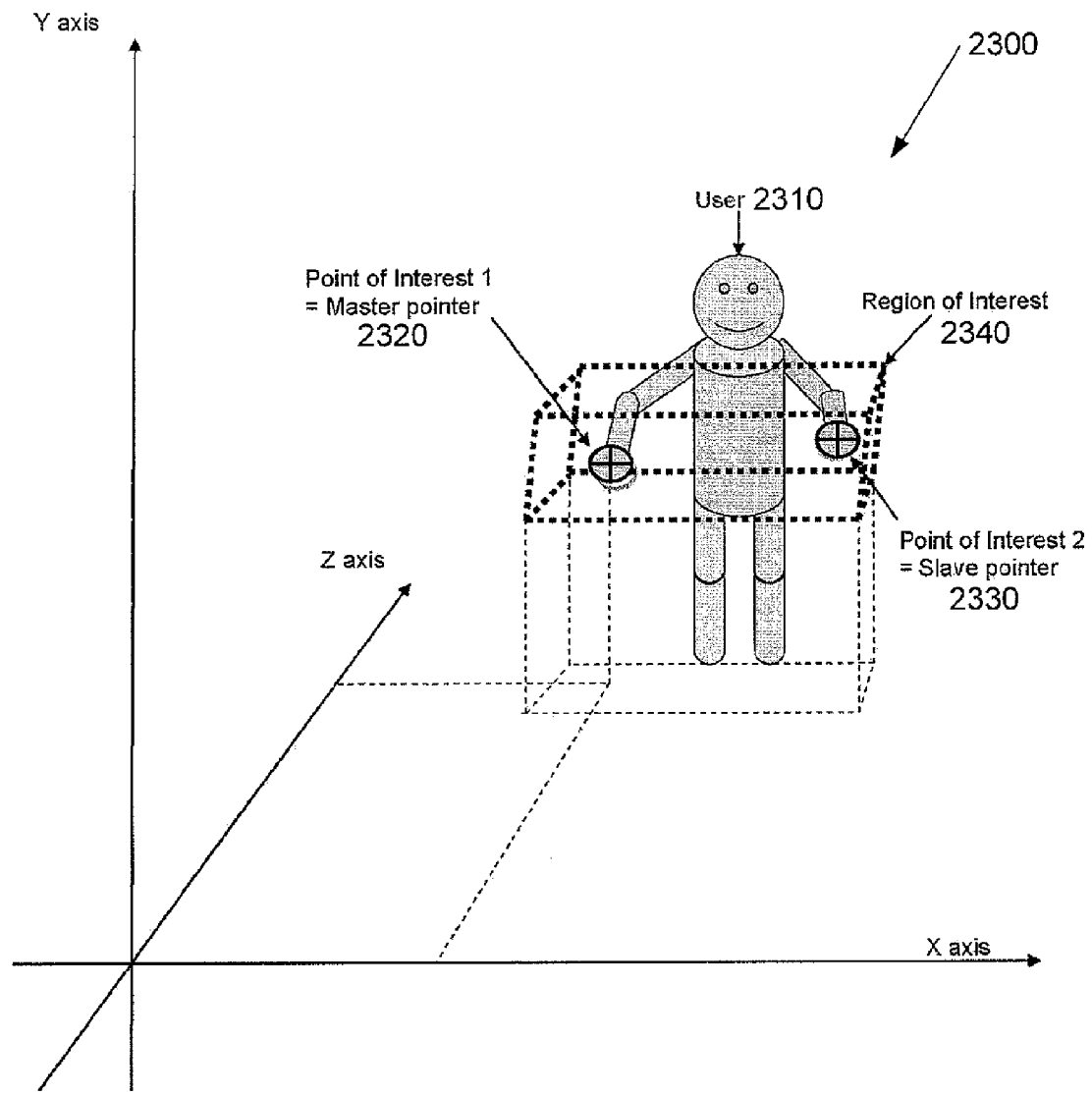
FIG. 23 illustrates a representation of a ROI and POI in a scene with a human being as the interaction controller.

In FIG. 23, a representation 2300 of a ROI and points of interest are shown. In the representation 2300, a representation of a human being user 2310 is provided on which two points of interest 2320 and 2330 are shown within a ROI 2340. The points of interest are typically but not exclusively, for a human being, representation of the hands. The ROI 2340 is shown as a dotted box in three-dimensional space that encompasses both the points of interest 2320, 2330. Each of these points of interest corresponds to a centroid and is located at a three-dimensional extremity of the region adjacency graph of the corresponding clustered image of the scene—in this case, the hands are extremities of the human body as they are located at the ends of the arms. One POI, POI 2320, is chosen as the master POI and the other POI, POI 2330, is the slave POI. In this particular embodiment, both the master POI and the slave POI can be used for control gestures, for example, selections, validation etc.

Figure 24:
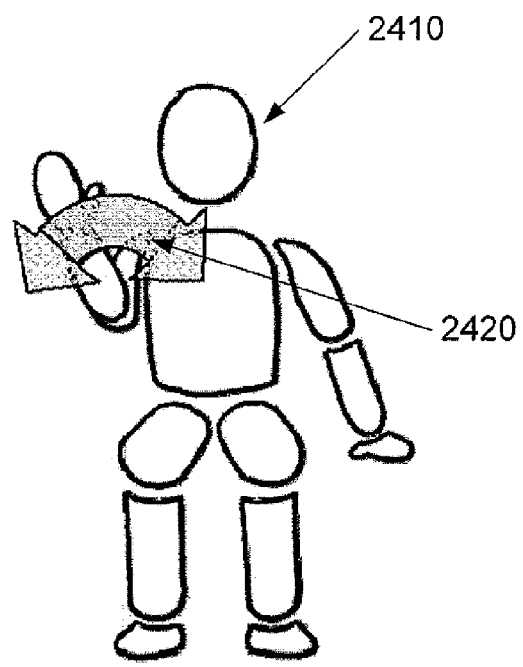
FIG. 24 illustrates activation and control gesture feedback graphical interface to teach the user the gesture he/she is expected to perform.
Figure 24:
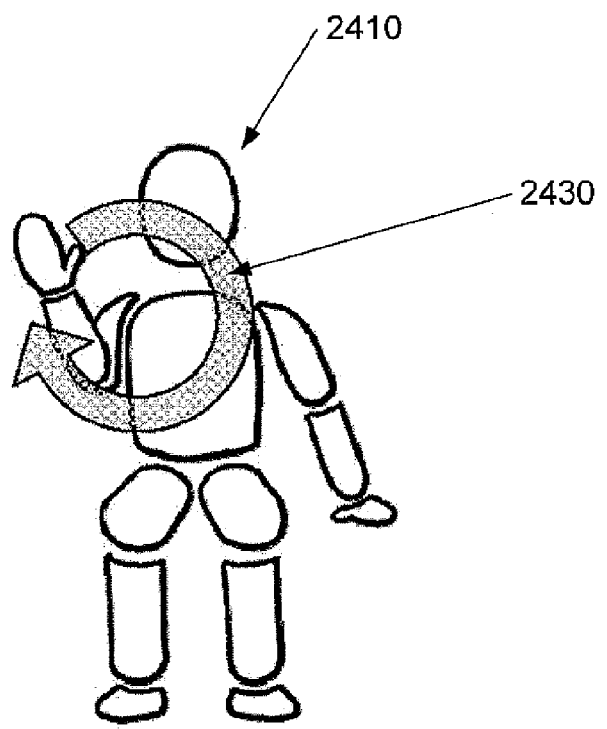

Activation and control gesture interface feedback is shown in FIG. 24. FIG. 24(a) illustrates a user/controller representation 2410 of the user with an oscillating movement of a hand 2420 illustrating a 'wave' gesture. Similarly, in FIG. 24(b), the user/controller representation 2410 is shown together with a circular movement of a hand 2430 illustrating a 'circle' gesture. The user/controller representation 2410 is not limited to that shown in FIGS. 24(a) and (b), but may be represented in any suitable form that would easily be recognised by a user.

The user/controller representation as shown in FIGS. 24(a) and (b) can typically be used as feedback information to indicate to a user which gesture is required at a particular time during his interaction with the user interface in accordance with the present invention.

Figure 25:
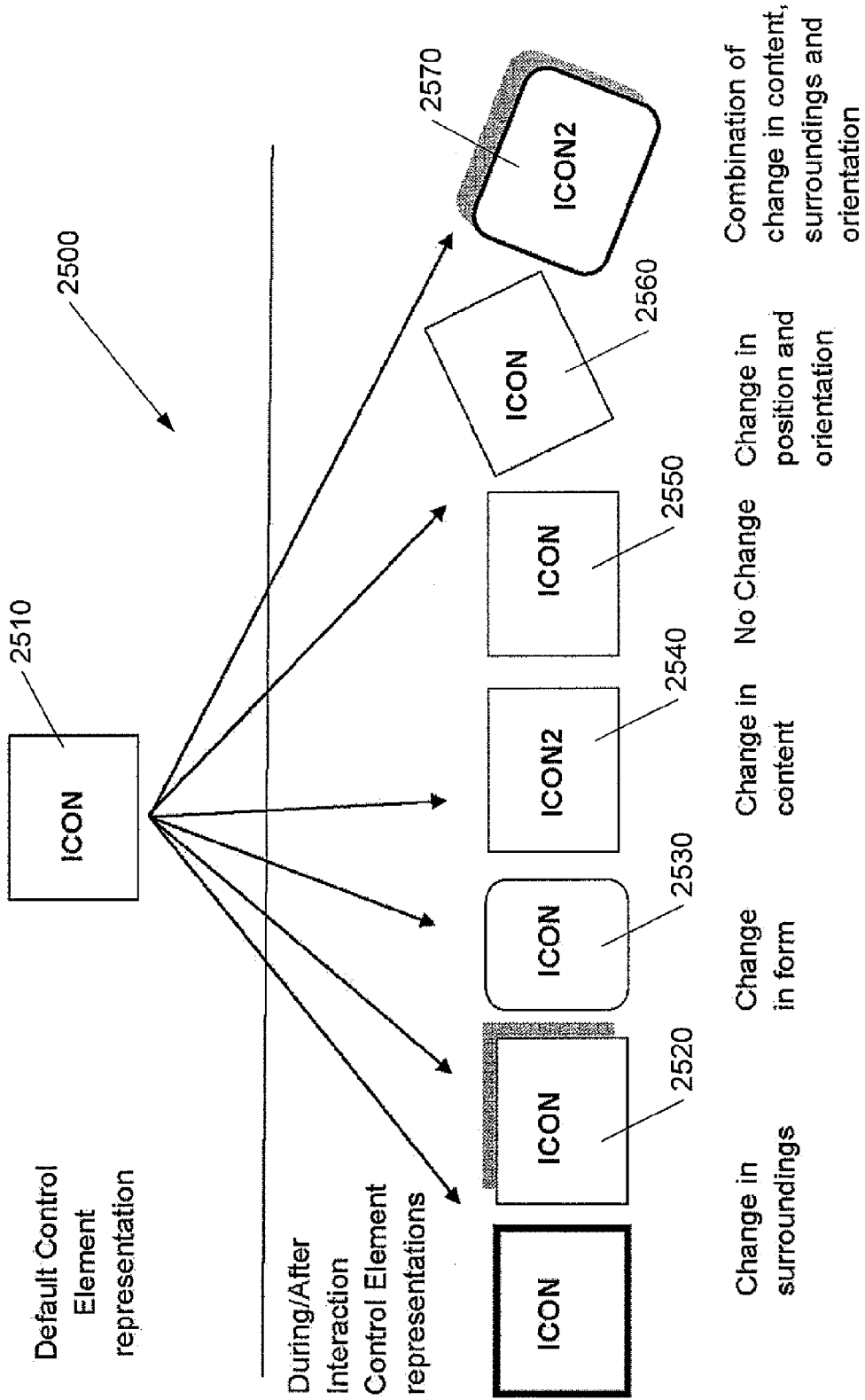
FIG. 25 illustrates a feedback interface element.

FIG. 25 illustrates one non-restrictive embodiment of interface element feedback 2500 following the interaction with a user (not shown). A default control element representation or icon is shown at 2510. During and/or after user interaction with the icon 2510, the icon may be displayed as one of the following: a change of surroundings shown at 2520; a change of form as shown at 2530; a change in content as shown at 2540; stays the same as shown at 2550; a change in position and orientation as shown at 2560; or a combination of changes, such as, change in form, surroundings and content, as shown at 2570.

Figure 26:
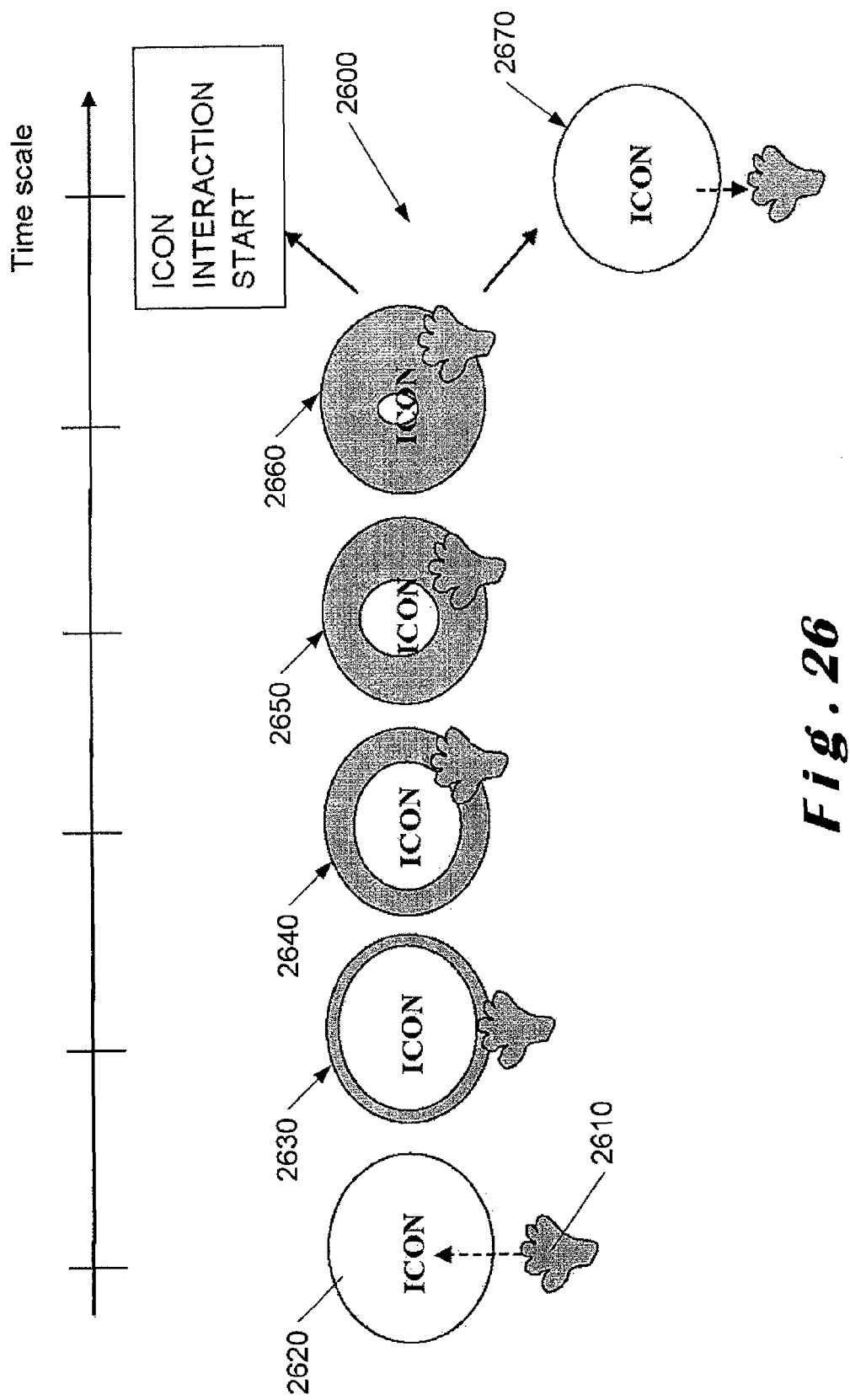
FIG. 26 illustrates a first preferred embodiment of a feedback interface element.

FIG. 26 illustrates a first preferred embodiment of an interface element feedback process 2600 in accordance with the present invention. A representation 2610 of POI controlling the interaction with the system, in the form of a hand, is shown. A graphical user interface (GUI) control element representation 2620 in the form of a circular button with 'ICON' on it is also shown. It will be appreciated that 'ICON' can be replaced with any other suitable emblem, terminology, or colour that will enable a user to understand what is required or with which interaction the corresponding element is associated. For example, the 'ICON' may be replaced with 'START GAME'. As the button 2620 is selected, its appearance changes, for example, the button becomes filled in or highlighted as shown, as an indication of the status of the interaction between the user and the button. This is shown progressively at 2630, 2640, 2650, until it reaches a position 2660 which initiates the desired action and/or selection. Once the button achieves the correct appearance indicating activation of the button, the user may release or de-select it as shown at 2670 or directly start interacting with a new representation of the user interface. The button may return to its initial appearance in readiness for the next activation if interaction does not make the user interface elements change.

Figure 27:
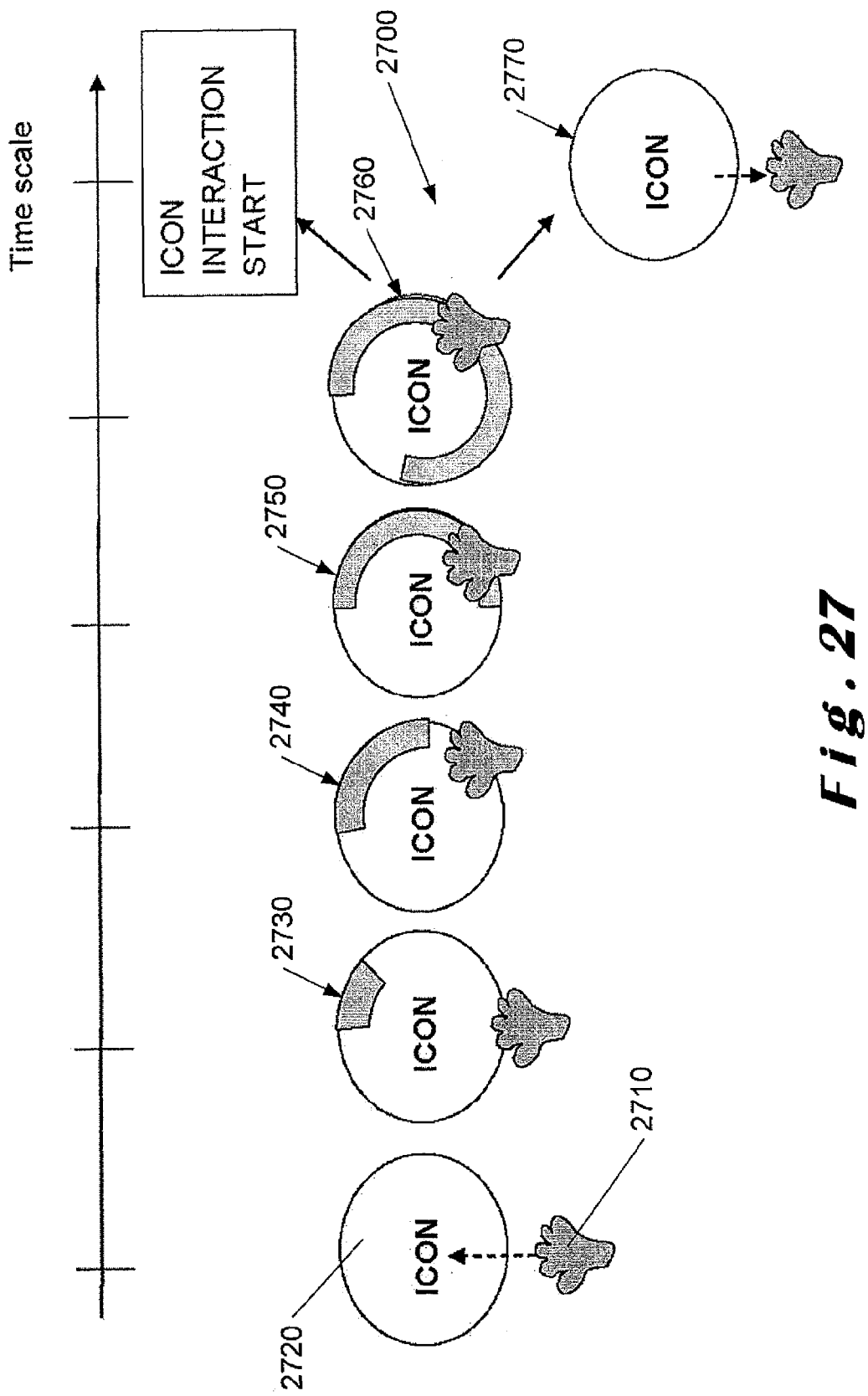
FIG. 27 illustrates a second preferred embodiment of a feedback interface element.

FIG. 27 illustrates, another preferred interface element feedback process 2700 in accordance with the present invention. The interface element feedback 2700 operates in the same way as the feedback process described with reference to FIG. 26 above. In this case, as the button 2720 is selected, its appearance changes but this time, an animation in the form of a ring 2730 is formed in stages with respect to time, as shown at 2740, 2750, 2760, as an indication of the status of the interaction between the user and the button until the desired action and/or selection has been initiated. Once the button achieves the correct appearance indicating activation of the button, the user may release or de-select it as shown at 2740 or start interacting with another interface if the control associated to the corresponding element makes the graphical user interface change. The button may return to its initial appearance in readiness for the next activation if the graphical user interface does not change.

Interface user representation feedback can also be provided in a similar way to that described with reference to FIG. 25 for interface element feedback. Representation of the user is shown as changing in accordance with interaction status. This interaction status may be contextually defined with menu elements or with user gesture controls. For example, a cursor/pointer representation may change according to its availability, its status (active or inactive), its location (within a designated ROI or outside that designated ROI) or its interaction status (interacting with a contextual interface control element or not). As before, during and/or after user interaction with an element, the element may be displayed as one of the following: a change of surroundings; a change of form; a change in content; stays the same; a change in position and orientation; or a combination of changes, such as, change in form, surroundings and content. Additionally, the embodiments described with reference to FIGS. 26 and 27 may also be implemented for user interface representation feedback.

Moreover, cursor orientation may change according to movement direction. For example, the cursor may be represented by a hand as described above and the hand representation stays open with respect to time, and only changes to a hand closed representation when an element has been selected/validated/grabbed in the interface.

Figure 28:
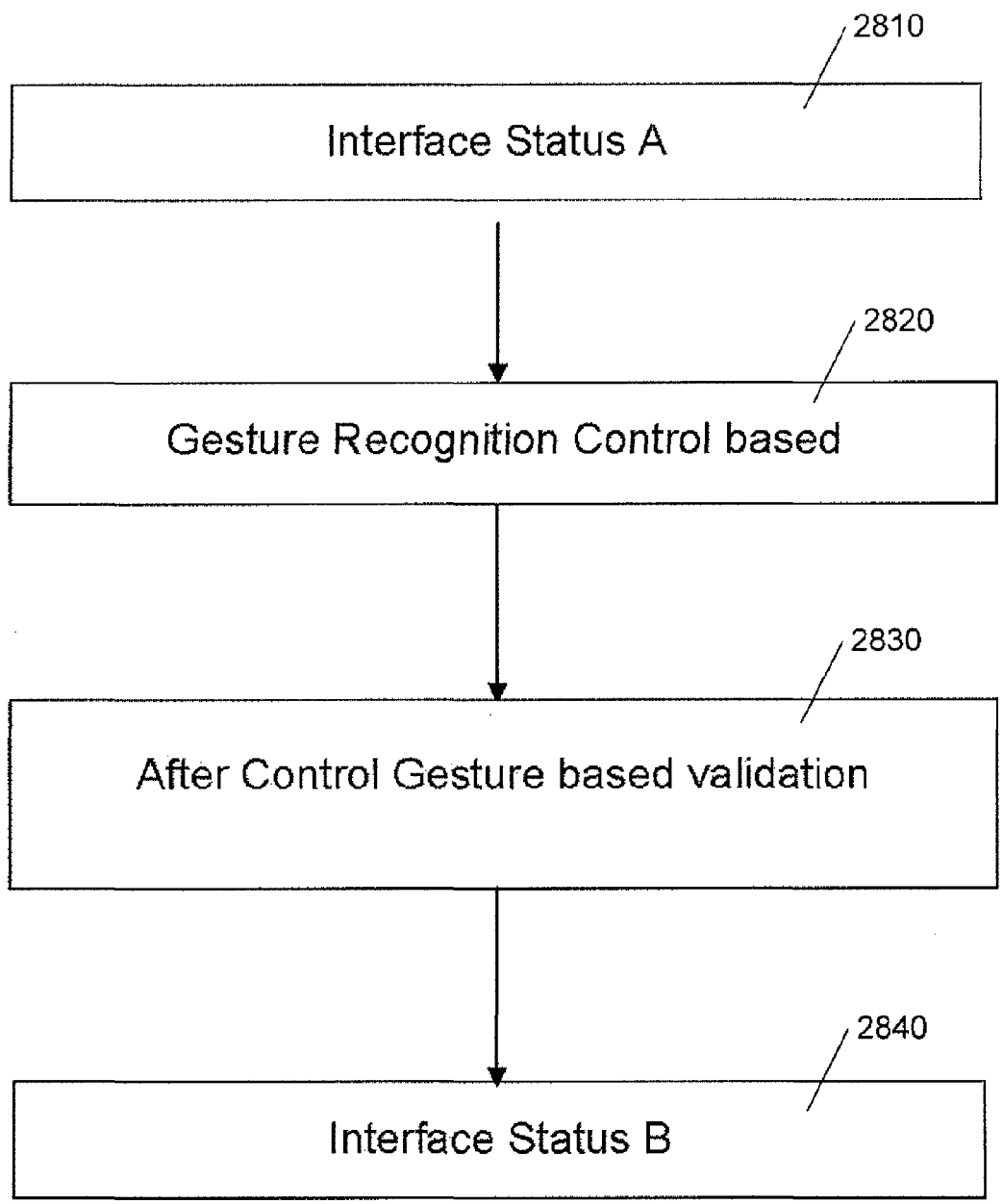
FIG. 28 illustrates a flow diagram of an after control interaction process.

FIG. 28 illustrates an interface after control interaction process in the form of a flow diagram 2800. In the diagram 2800, a first interface status 2810 is shown that provides an input to a gesture recognition based control process 2820. This process provides an input to an after control gesture based validation process 2830 which provides as an output a second interface status 2840.

This process is an illustration for the introduction of a gesture control validation process. The goal of the gesture control validation process is to validate a performed and recognised gesture control with a simple after control interaction to prevent further or erroneous gesture to execute an unwished control/command/action. For example, a user may perform a circle gesture while looking a movie, said circle gesture being associated to a process in the system which makes the main menu of the system appear on screen. The after control process may make appear a 'YES'/'NO' validation box asking the user if he is sure that he wants to quit the movie and access the main menu. To make use of the 'YES'/'NO' validation box, the after control requires an input using another natural gesture control, for example, a right swipe indicating 'YES' and a left swipe indicating 'NO'. Furthermore, in another embodiment, the control of this validation box may only be activated if the POI executing the gesture is maintained at a predetermined location for a predetermined period of time. The validation interface may then change its appearance in accordance with the control being activated, for example, the interface may change from red to green once the validation interface may be ready to be used.

Additionally, the method and system of the present invention has the following advantages:

(i) Scalability to capturing device input data, that is, compliant with images of any resolution;

(ii) Real-time cross-platform operation, that is, compliant with any hardware and/or operating system;

(iii) No prior user/object detection and/or identification required;

(iv) No prior user part/object part detection and/or identification required;

(v) No gesture classifier required;

(vi) Multiple controllers may be allowed, that is, multiple ROI and/or multiple users/objects;

(vii) Multiple POIs may be allowed, that is, several POs allowed in each single ROI;

(viii) No specific tracking/motion estimation algorithm required;

(ix) Improved user experience with minimal physical effort interface, that is, interface layout organisation;

(x) Intuitive and efficient interface, that is, using a few natural gestures for control; and (xi) Intelligent contextual information feedback from the interface.

Although the user interface of the present invention has been described with respect to particular embodiments, it will be understood that the present invention can be implemented using other embodiments.

The invention claimed is:

1. A method for interacting with a user interface system using gesture recognition, the method comprising the steps of:
   a) forming at least one multi-dimensional representation of a scene within a field of view of at least one multi-dimensional imaging system;
   b) performing a multi-dimensional constrained clustering operation on said multi-dimensional representation of the scene to provide a clustered representation of said scene; and
   c) identifying point of interest candidates from said clustered representation which can be used for gesture recognition, a point of interest candidate being identified as a cluster that is connected to only one other cluster and which exhibits coherent motion; and
   d) controlling said user interface system in accordance with recognised gestures performed by said at least one point of interest candidate.

2. A method according to claim 1, further comprising the step of recognizing the performance of a gesture of a point of interest candidate using at least continuous trajectory analysis including the steps of:
   identifying trajectory points along a trajectory of a point of interest candidate;
   identifying at least one multi-dimensional change in trajectory direction of a point of interest candidate, said at least one multi-dimensional change forming a reference seed point having a reference seed identification order;
   identifying successive changes in trajectory direction, each of said successive changes forming successive reference seed points; and
   using said reference seed points and said trajectory points to recognise a gesture.

3. A method according to claim 2, wherein said trajectory analysis further comprises the step of: determining, for each seed point, at least one of: distance, velocity vector and acceleration vector relative to one of: previous points or previous seed points.

4. A method according to claim 3, wherein said trajectory analysis further comprises the step of using geometric and statistical computation for each point to recognise the gesture.

5. A method according to claim 1, further comprising the step of activating a point of interest candidate as an activated point of interest if it has first performed a predetermined gesture, said activated point of interest still having point of interest candidate status.

6. A method according to claim 5, further comprising the step of determining a region of interest associated with said activated point of interest.

7. A method according to claim 5, further comprising activating at least one further point of interest candidate as at least one further activated point of interest when it has performed a predetermined gesture, said at least one further activated point of interest still having point of interest candidate status.

8. A method according to claim 7, further comprising determining at least one further region of interest associated to said at least one further activated point of interest.

9. A method according to claim 6, wherein each region of interest has its position and dimensions set relative to a position of a point of interest candidate.

10. A method according to claim 6, further comprising the step of recognising a predetermined gesture performed by at least one predetermined point of interest candidate within said at least one determined region of interest.

11. A method according to claim 1, wherein said user interface system includes a gesture based virtual keyboard having a graphical user interface, said graphical user interface having a predetermined arrangement of elements for selection using only minimal natural gestures performed by at least one point of interest candidate.

12. A method according to claim 1, further comprising the step of:
   e) controlling said user interface system in accordance with coherent motion of at least one point of interest candidate.

13. A method according claim 1, wherein step e) further comprises the step of providing contextual feedback information in accordance with current status of said user interface system.

14. A method according to claim 1, wherein step b) comprises using multi-resolution image processing.

15. A method according to claim 1, wherein each multi-dimensional representation comprises a three-dimensional representation.

16. A system for interacting with a user interface system using gesture recognition, the system comprising:
   means for forming at least one multi-dimensional representation of a scene within a field of view of at least one multi-dimensional imaging system;
   means for performing a multi-dimensional constrained clustering operation on said multi-dimensional representation to provide a clustered representation of said scene; and
   means for identifying point of interest candidates from said clustered representation which can be used for gesture recognition; and
   means for controlling said user interface system in accordance with recognised gestures;
   wherein the means for identifying points of interest candidates comprises means for identifying at least one cluster that is connected to only one other cluster and which exhibits coherent motion as a point of interest candidate.

17. A system according to claim 16, further comprising means for recognizing the performance of a gesture of a point of interest candidate which uses at least continuous trajectory analysis including:
- means for identifying trajectory points along a trajectory of a point of interest candidate,
- means for identifying at least one multi-dimensional change in trajectory direction of a point of interest candidate, said at least one multi-dimensional change forming a reference seed point having a reference seed identification order,
- means for identifying successive changes in trajectory direction, each of said successive changes forming successive reference seed points, and
- means for using said reference seed points and said trajectory points to recognise a gesture.

18. A system according to claim 17, wherein the means for using trajectory analysis further comprises means for determining, for each seed point, at least one of: distance, velocity vector and acceleration vector relative to previous seed points.

19. A system according to claim 18, wherein the means for using trajectory analysis further comprises means for using geometric and statistical computation for each point to recognise the gesture.

20. A system according to claim 16, further including a gesture based virtual keyboard having a graphical user interface, said graphical user interface having a predetermined arrangement of elements for selection using only minimal natural gestures.

* * * * *